United States Patent
Zhou et al.

(10) Patent No.: US 9,234,436 B2
(45) Date of Patent: Jan. 12, 2016

(54) AIR-POWERED GENERATOR SYSTEM WITH ELECTROMAGNETIC AUXILIARY POWER UNIT

(75) Inventors: Dengrong Zhou, Sanhe (CN); Jian Zhou, Sanhe (CN)

(73) Assignee: BEIJING XIANGTIAN HUACHUANG AERODYNAMIC FORCE TECHNOLOGY RESEARCH INSTITUTE COMPANY LIMITED, Beijing (CN)

( * ) Notice: Subject to any disclaimer, the term of this patent is extended or adjusted under 35 U.S.C. 154(b) by 82 days.

(21) Appl. No.: 13/574,983

(22) PCT Filed: Mar. 26, 2012

(86) PCT No.: PCT/CN2012/073016
§ 371 (c)(1),
(2), (4) Date: Aug. 8, 2012

(87) PCT Pub. No.: WO2013/075438
PCT Pub. Date: May 30, 2013

(65) Prior Publication Data
US 2014/0246867 A1 Sep. 4, 2014

(30) Foreign Application Priority Data

Nov. 22, 2011 (CN) .......................... 2011 1 0373210
Nov. 22, 2011 (CN) .......................... 2011 1 0373222

(51) Int. Cl.
*F02D 29/06* (2006.01)
*H02K 7/20* (2006.01)
(Continued)

(52) U.S. Cl.
CPC .............. *F01D 15/10* (2013.01); *F01B 17/025* (2013.01); *F01B 25/02* (2013.01); *F02B 63/04* (2013.01);
(Continued)

(58) Field of Classification Search
CPC ....... F01D 15/10; H02K 7/1815; F01B 25/02; F01B 17/025; F01B 17/02; F02B 63/04–63/048; B60K 6/12; F16F 15/30
USPC ............ 60/370–372, 407–412; 310/68 B, 74, 310/113
See application file for complete search history.

(56) References Cited

U.S. PATENT DOCUMENTS 1,845,386 A * 2/1932 Zetsche .................. H02K 23/54
310/46
3,563,032 A * 2/1971 Pointe ..................... F01B 21/02
60/412
(Continued)

FOREIGN PATENT DOCUMENTS

CN 2512700 Y 7/2001
CN 101413403 A 4/2009
(Continued)

OTHER PUBLICATIONS

Machine Translation of CN 101413403 A, the underlying document published Apr. 22, 2009, translation retrieved from www.espacenet.com on Jun. 4, 2015.*

*Primary Examiner* — Thomas Denion
*Assistant Examiner* — Mickey France
(74) *Attorney, Agent, or Firm* — Caesar Rivise, PC

(57) ABSTRACT

A generator system uses compressed air as a power source and utilizes an electromagnetic auxiliary power unit. The generator system includes an engine (1), a multiple-column power distributor (2), a generator system (4), a controller system (6), an intake speed control valve (23), a high pressure gas tank (13), a constant pressure tank (16), an electronic control unit ECO (29), an electromagnetic auxiliary power unit (1000), a power distributor (1100) and an end gas recycle loop. The end gas recycle loop includes an air compressor (7), a condenser (11), an end gas recycle tank (9), an electro-drive turbine unidirectional suction pump (19) and an end gas muffler (22).

4 Claims, 11 Drawing Sheets

(51) Int. Cl.
*F16D 31/02* (2006.01)
*F01D 15/10* (2006.01)
*F02G 5/02* (2006.01)
*F01B 17/02* (2006.01)
*F01B 25/02* (2006.01)
*F02B 63/04* (2006.01)
*H02K 53/00* (2006.01)
*H02K 7/18* (2006.01)
*B60K 6/12* (2006.01)

(52) U.S. Cl.
CPC ............... *F02G 5/02* (2013.01); *H02K 7/1815* (2013.01); *H02K 53/00* (2013.01); *B60K 6/12* (2013.01); *Y02T 10/166* (2013.01)

(56) References Cited

U.S. PATENT DOCUMENTS

| | | | | |
|---|---|---|---|---|
| 3,765,180 A * | 10/1973 | Brown | F01B 17/02 | 180/302 |
| 3,806,785 A * | 4/1974 | DeValroger | H02K 29/12 | 318/400.02 |
| 3,847,058 A * | 11/1974 | Manor | B60G 13/14 | 137/596 |
| 3,885,387 A * | 5/1975 | Simington | F01B 17/02 | 123/DIG. 7 |
| 3,925,984 A * | 12/1975 | Holleyman | B60K 3/02 | 180/302 |
| 3,961,484 A * | 6/1976 | Harp, Jr. | F02G 3/02 | 60/597 |
| 4,018,050 A * | 4/1977 | Murphy | F01B 1/02 | 60/370 |
| 4,104,955 A * | 8/1978 | Murphy | F01B 15/04 | 91/176 |
| 4,162,614 A * | 7/1979 | Holleyman | F01B 17/02 | 180/302 |
| 4,269,280 A * | 5/1981 | Rosen | B60K 5/08 | 180/65.25 |
| 4,292,804 A * | 10/1981 | Rogers, Sr. | F01B 17/02 | 60/407 |
| 4,455,492 A * | 6/1984 | Guelpa | B60K 6/485 | 180/65.26 |
| 4,458,156 A * | 7/1984 | Maucher | B60K 6/48 | 180/165 |
| 4,696,158 A * | 9/1987 | DeFrancisco | F02G 3/02 | 60/39.62 |
| 4,754,612 A * | 7/1988 | Dibrell | G05D 17/02 | 60/698 |
| 4,896,505 A * | 1/1990 | Holleyman | F04F 5/54 | 417/65 |
| 5,053,632 A * | 10/1991 | Suzuki | B60K 6/26 | 180/65.26 |
| 5,185,543 A * | 2/1993 | Tebbe | B60K 17/22 | 123/192.1 |
| 5,229,696 A * | 7/1993 | Golker | H02K 24/00 | 310/184 |
| 5,254,894 A * | 10/1993 | Satake | H02K 16/00 | 310/113 |
| 5,460,239 A * | 10/1995 | Jensen | B60K 3/00 | 180/302 |
| 5,514,923 A * | 5/1996 | Gossler | H02J 7/14 | 310/113 |
| 5,515,675 A * | 5/1996 | Bindschatel | F02B 69/06 | 60/370 |
| 5,560,267 A * | 10/1996 | Todd | F01L 1/02 | 123/90.31 |
| 5,982,070 A * | 11/1999 | Caamano | H02K 1/02 | 29/596 |
| 6,121,705 A * | 9/2000 | Hoong | H02K 16/02 | 310/103 |
| 6,199,521 B1 * | 3/2001 | Endou | F02B 67/04 | 123/294 |
| 6,278,196 B1 * | 8/2001 | Ehrhart | B60K 6/485 | 180/65.31 |
| 6,278,915 B1 * | 8/2001 | Deguchi | B60K 6/543 | 180/65.235 |
| 6,286,467 B1 * | 9/2001 | Ancheta | F02B 69/06 | 123/21 |
| 6,311,486 B1 | 11/2001 | Negre et al. | | |
| 7,350,602 B2 * | 4/2008 | Colvin | B60K 6/365 | 180/65.28 |
| 7,461,626 B2 * | 12/2008 | Kimes | B60K 6/12 | 123/242 |
| 7,559,394 B2 * | 7/2009 | Rask | B60L 11/1887 | 180/165 |
| 7,631,624 B2 * | 12/2009 | Pflug | F01L 1/02 | 123/90.16 |
| 2001/0024075 A1 * | 9/2001 | Caamano | H02K 1/02 | 290/52 |
| 2003/0217617 A1 * | 11/2003 | Sakamoto | B60K 6/36 | 74/665 B |
| 2004/0009842 A1 * | 1/2004 | Inada | B60K 6/442 | 477/5 |
| 2004/0012203 A1 * | 1/2004 | Schlangen | F02N 11/04 | 290/31 |
| 2005/0130796 A1 * | 6/2005 | Loeffler | B60K 6/48 | 477/4 |
| 2007/0056784 A1 * | 3/2007 | Joe | B60K 6/48 | 180/65.245 |
| 2007/0199744 A1 * | 8/2007 | Leman | B60K 6/105 | 180/65.22 |
| 2007/0284888 A1 * | 12/2007 | Shimazaki | F02P 7/067 | 290/38 C |
| 2008/0088200 A1 * | 4/2008 | Ritchey | H02K 16/00 | 310/268 |
| 2008/0136191 A1 * | 6/2008 | Baarman | F03B 1/00 | 290/54 |
| 2009/0174277 A1 * | 7/2009 | Mueller | F03B 13/1845 | 310/156.64 |
| 2009/0183504 A1 * | 7/2009 | Shofner, II | F01B 17/02 | 60/370 |
| 2010/0296949 A1 * | 11/2010 | Corley | F04B 9/1095 | 417/279 |
| 2012/0116624 A1 * | 5/2012 | Reith | B60K 6/48 | 701/22 |
| 2012/0159940 A1 * | 6/2012 | Cong | F16K 17/105 | 60/407 |
| 2012/0175876 A1 * | 7/2012 | Pendray | F02D 19/02 | 290/41 |
| 2014/0053541 A1 * | 2/2014 | Timmons | B60K 6/12 | 60/327 |
| 2014/0130485 A1 * | 5/2014 | Huff | B60K 3/02 | 60/327 |

FOREIGN PATENT DOCUMENTS

| | | | | |
|---|---|---|---|---|
| DE | 4423577 A1 * | 8/1995 | | F02B 75/06 |
| FR | 2731472 A1 | 6/1995 | | |
| WO | WO2004009424 A1 | 1/2004 | | |
| WO | WO2010051668 A1 | 5/2010 | | |

* cited by examiner

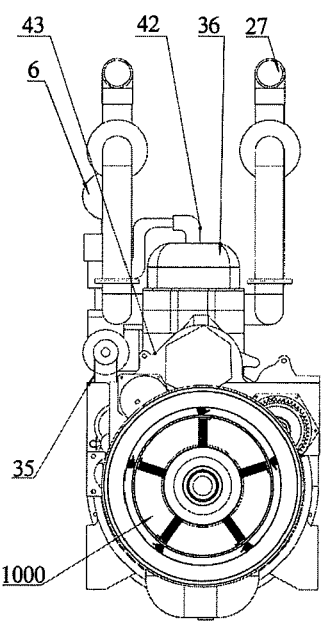
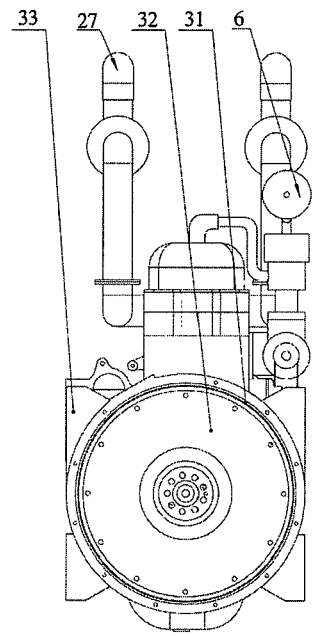
Fig. 3    Fig. 4
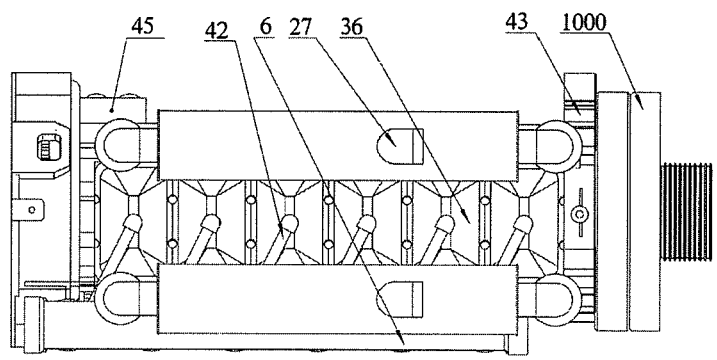
Fig. 5

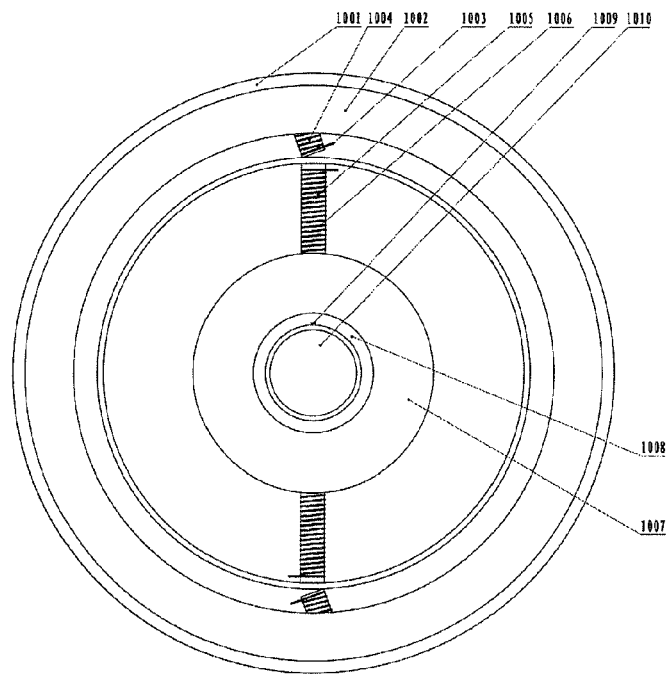
Fig. 13B
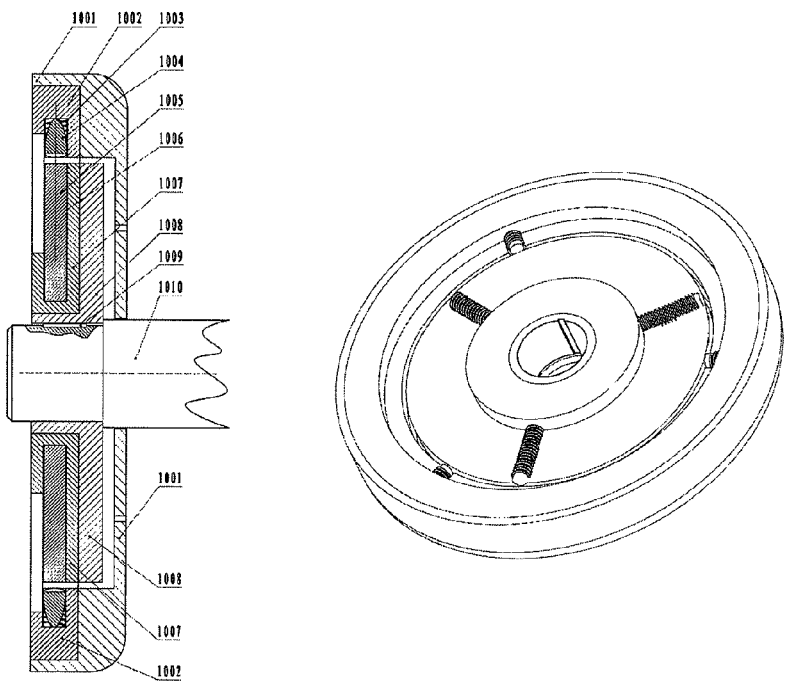
Fig. 13C
Fig. 14A

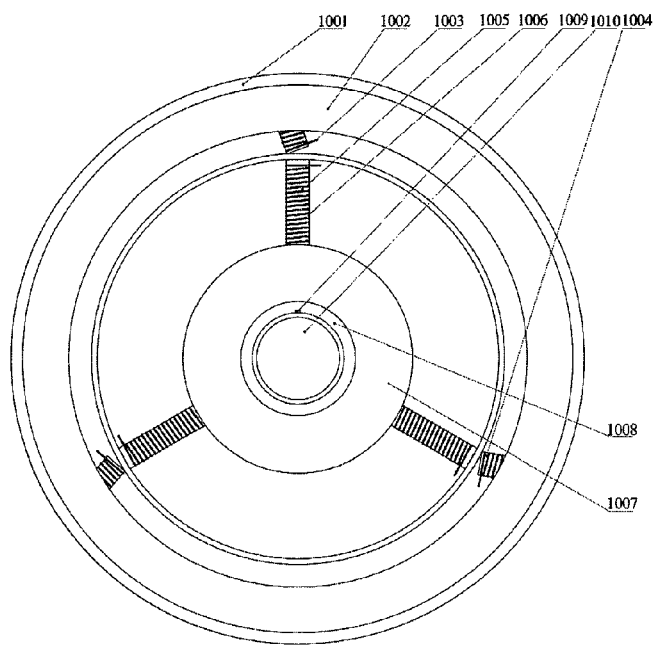
Fig. 14B
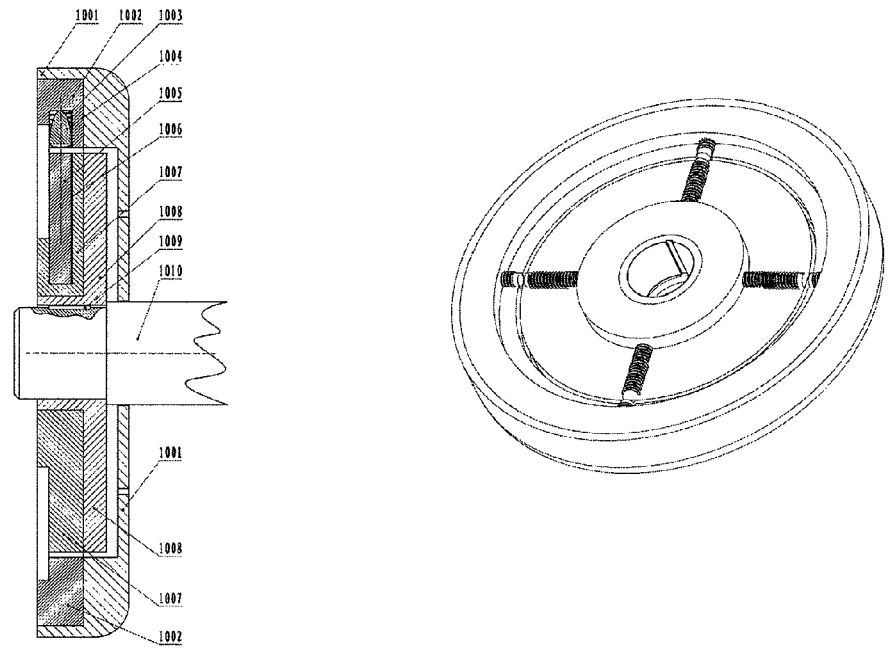
Fig. 14C
Fig. 15A

US 9,234,436 B2

AIR-POWERED GENERATOR SYSTEM WITH ELECTROMAGNETIC AUXILIARY POWER UNIT

TECHNICAL FIELD

The invention relates to a generator system, and more particularly relates to a generator system which uses compressed air as the power source and utilizes an electromagnetic auxiliary power unit, and furthermore, the invention also relates to an electromagnetic auxiliary power unit for an air-powered generator system.

BACKGROUND

Most of the conventional generator systems use the piston type engines utilizing fuel as the power source. The engine utilizing the fuel as the power source would discharge gas with many harmful substances to pollute the environment because of insufficient fuel combustion on one hand, and on the other hand, the fuel is extracted from petroleum, and the development and utilization of the system using the fuel engine as the power source are increasingly limited by the increasing lack of the petroleum source. So an impending problem is to develop new, clean and pollution-free alternative energy sources or decrease the fuel consumption and the emissions as far as possible. Therefore, many intricate and hard efforts are made in various countries, and many power sources such as alternative fuels, electro-drive, fuel cells and solar cells etc are studied and developed. But the new power sources or the hybrid power sources constructed thereof also have many disadvantages, so a new type of pollution-free and inexhaustible power source is needed, and the compressed air power source meets the need fitly.

An engine operating at fuel supply mode and compressed air supply mode is disclosed in FR2731472A1. The engine uses common fuel such as gasoline or kerosene on the highways, and when slow moving in the urban and the suburb, the compressed air (or other pollution-free compressed gas) is injected in the combustion chamber. The engine can decrease the fuel consumption partially, but the emission problem isn't solved because of utilizing the operating mode of fuel.

In order to further decrease pollution, a net air-powered engine is disclosed in U.S. Pat. No. 6,311,486 B1. This type of engine utilizes three independent chambers: an intake-compression chamber, an expansion and discharge chamber, and a constant volume combustion chamber. The intake-compression chamber is connected with the constant volume combustion chamber by a valve, and the constant volume combustion chamber is connected with the expansion and discharge chamber by a valve. One question of the engine is that the compressed air takes a long time to travel from the intake-compression chamber to the expansion and discharge chamber, so it takes a long time to obtain the power source gas for driving the piston to do work. At the same time, the high pressure gas discharged from the expansion and discharge chamber is not used, so the operation efficiency and the continuous working period for one charge of the engine are limited.

An air-powered engine assembly used in a vehicle is disclosed in a patent document CN101413403A (the family PCT application is WO2010051668A1) of the present applicant. The engine includes a gas tank, an air distributor, an engine, a linkage device, a clutch, an automatic transmission a differential mechanism and an impeller generator placed in the discharge chamber. The engine utilizes the compressed air to do work without any fuel, so no exhaust gas is discharged, and the "zero emission" is achieved. The exhaust gas is used repeatedly to generate electricity, so it can save the energy source and reduce the cost. But the engine is based on the traditional four-stroke engine, and when the crankshaft rotates through 720 degrees, the piston does work once. The high pressure air used as the power source can push the piston to do work when entering the cylinder, and then discharge, i.e., the strokes of the compressed air engine are an intake-expansion stroke and a discharge stroke actually. Obviously, the four-stroke engine disclosed in the patent document CN101413403A greatly wastes the effective working stroke, and the efficiency of the engine is limited. And the end gas of the engine can't be cycled and utilized well, and it needs a large enough gas tank to store the high pressure air for working a long time, so the applied prospect of the compressed air engine in the industry is degraded.

The air-powered engines mentioned above are based on when the pistons move at the bottom dead point in the cylinders, the pistons are driven by the flywheels and continue to move from the bottom dead point to the top dead point by the inertia of the crankshaft movement, so the compressed air in the working chambers is discharged. However, because the compressed air has high pressure after expanding for pushing the pistons to do work in the working chamber, and the compressed air under a pressure is discharged by the pistons by means of the rotary inertia of the crankshafts and the flywheels, it seems "lack power", and the condition appears notably when the engine rotates with low speed. In order to improve the rotary speed of the air-powered engine as far as possible, the pistons are needed to move more quickly in the working chamber. And in order to improve the stable torque output at a low rotary speed of the air-powered engine, an auxiliary power unit is needed for the crankshaft.

Now, the common auxiliary power unit is an electromagnetic or permanent magnetic auxiliary power unit. Chinese patent document CN2512700Y disclosed an electromagnetic auxiliary power unit for a bicycle which assists rotation of a wheel by means of the interaction of a magnet and an electromagnet, so double effects of saving energy and auxiliary power are realized. Another patent document WO2004009424A1 disclosed an electric powered steering gear using an electromagnetic coil to relieve the fatigue of a driver. So the auxiliary power unit using an electromagnet or a permanent magnet as a movable part is put in practice in many industries.

An object of the invention is to provide a generator system using a compressed air-powered engine as the power source, so the application of the compressed air can be realized in industrial power generation. And the air-powered engine system disclosed in the present application includes an electromagnetic auxiliary power unit for the crankshaft auxiliary power. So it provides the rotary auxiliary power for the crankshaft of the engine, and thus improves the rapid rotary performance of the air-powered engine and the stable torque output at low rotary speed, and then increases the efficiency of the air-powered engine.

SUMMARY OF THE INVENTION

In accordance with one aspect of the present invention, an air-powered generator system with an electromagnetic auxiliary power unit is provided, which includes an engine. The engine includes a cylinder, a cylinder head system, an intake pipeline, a discharge pipeline, a piston, a linkage, a crankshaft, a discharge camshaft, an intake camshaft, a front gear box system and a back gear box. The said piston is connected to the crankshaft via the linkage, and the said front gear box system is adapted to transmit the movement of the crankshaft and the camshaft. An air throat hole for the compressed air intake and a discharge hole for the end gas discharge are placed on the said cylinder head system. The air-powered generator system also includes a high pressure gas tank set which is connected to an external charge device via a pipeline and a constant pressure tank which is connected to the high pressure gas tank set via a pipeline. Wherein the said air-powered generator system with the electromagnetic auxiliary power unit also includes an intake speed control valve which is communicated with the constant pressure tank via a pipeline, a controller system, an electromagnetic auxiliary power unit, a multiple-column power distributor which is connected to the crankshaft of the engine, a generator system which is connected to the multiple-column power distributor via a clutch, an electronic control unit ECO which controls the intake speed control valve on the basis of the detected signal of a sensor, a power distribution device and an end gas recycle loop.

In an embodiment of the present invention, the said engine is a two-stroke engine.

In an exemplary embodiment, the said end gas recycle loop includes a discharge header, an air compressor, a condenser, an end gas recycle tank, an electro-drive turbine unidirectional suction pump and an end gas muffler, wherein the end gas enters the end gas muffler through the discharge header and is suctioned in the end gas recycle tank by the electro-drive turbine unidirectional suction pump. The end gas accumulated in the end gas recycle tank is sent to the high pressure gas tank set after being compressed and pressurized by the air compressor and after being cooled by the condenser.

Preferably, the said electronic control unit receives a signal from an angular displacement sensor to control the electric current in a coil of the electromagnetic auxiliary power unit.

Preferably, the said air compressor is connected to the multiple-column power distributor by a coupling, so the air compressor is driven by the power transmitted from the multiple-column power distributor to work for compressing the end gas from the end gas recycle tank.

Preferably, the said controller system includes a high pressure common rail constant pressure pipe, a controller upper cover, a controller mid seating and a controller bottom base. The controller upper cover, the controller mid seating and the controller bottom base are connected by bolts removably and hermetically.

Preferably, the intake pipeline is placed in the said controller upper cover. The intake pipeline is connected to the high pressure common rail constant pressure pipe via threaded connection. A controller intake valve, a controller valve spring, an oil seal bush, a controller valve spring bottom base and a controller valve seating are mounted in the said controller mid seat. The said controller valve is butted against the controller valve seating under the pre-action of the controller valve spring. A controller tappet which controls the opening and closure of the controller valve is placed in the said controller bottom base, and the controller tappet is actuated by the intake camshaft.

In another embodiment, the number of the cylinders is six, and the crankshafts include six unit bell cranks.

Preferably, the said six unit bell cranks are a first bell crank, a second bell crank a third bell crank, a fourth bell crank, a fifth bell crank and a sixth bell crank. Individually, and the phase of each bell crank is set up as follows: the phase difference of the first bell crank and the second bell crank is 120 degrees, the phase difference of the second bell crank and the third bell crank is 120 degrees, the phase difference of the third bell crank and the fourth bell crank is 180 degrees, the phase difference of the fourth bell crank and the fifth bell crank is −120 degrees, the phase difference of the fifth bell crank and the sixth bell crank is −120 degrees.

In accordance with another aspect of the present invention, an electromagnetic auxiliary power unit for an air-powered engine assembly is provided, wherein the said air-powered engine assembly includes an engine which includes a cylinder, a cylinder head system, an intake pipeline, a discharge pipeline, a piston, a linkage, a crankshaft, a discharge camshaft and an intake camshaft. The air-powered engine assembly also includes a high pressure gas tank set which is connected to an external charge device via a pipeline, a constant pressure tank which is connected to the high pressure gas tank set via a pipeline, an intake speed control valve which is communicated with the constant pressure tank via a pipeline, and an electronic control unit ECO. The said electromagnetic auxiliary power unit includes a stator portion, a rotor portion and an auxiliary power unit housing, wherein the said stator portion and the rotor portion are set up independently, and the said stator portion is fixed on the said auxiliary power unit housing.

Preferably, the said stator portion includes a stator iron core fixed disk, a stator iron core and a stator iron core coil, the said rotor portion includes a rotor iron core fixed disk, a rotor iron core, a rotor iron core coil and an auxiliary power unit flywheel.

Preferably, the said stator iron core fixed disk and the auxiliary power unit housing are connected via threaded connection or interferentially fit. The said auxiliary power unit housing is fixed on the engine by fasteners penetrated through housing mounting holes. The rotor iron core fixed disk and the auxiliary power unit flywheel are connected via threaded connection or interferentially fit, and the auxiliary power unit flywheel is fixed on an extensive end of the engine crankshaft via a key so as to rotate along with the crankshaft.

Preferably, the electromagnetic auxiliary power unit also includes an angular displacement sensor. The said angular displacement sensor is communicated with the electronic control unit ECO, so the signal of the rotary angular displacement of the crankshaft is sent to the electronic control unit ECO.

In a preferable embodiment, the number of the rotor iron cores is two. The rotor iron cores are placed on the rotor iron core disk and spaced apart 180 degrees from each other. The number of the stator iron cores is two, and the stator iron cores are placed on the stator iron core disk and spaced apart 180 degrees each other.

In another preferred embodiment, the number of the rotor iron cores is three. The adjacent rotor iron cores are spaced apart 120 degrees and placed on the rotor iron core disk. The number of the stator iron cores is three, and the adjacent stator iron cores are spaced apart 120 degrees and placed on the rotor iron core disk.

In another preferred embodiment, the number of the rotor iron cores is four. The adjacent rotor iron cores are spaced apart 90 degrees and placed on the rotor iron core disk. The number of the stator iron cores is four, and the adjacent stator iron cores are spaced apart 90 degrees and placed on the rotor iron core disk.

In another preferred embodiment, the number of the rotor iron cores is five. The adjacent rotor iron cores are spaced apart 72 degrees and placed on the rotor iron core disk. The number of the stator iron cores is five, and the adjacent stator iron cores are spaced apart 72 degrees and placed on the rotor iron core disk.

In an exemplary embodiment of the present invention, the said stator iron cores are mounted angularly on the said stator iron core disk, so that the electromagnetic force is induced along with the rotor iron cores at initial position better.

Preferably, the said stator iron core is made up of stacked silicon steel sheets, and the rotor iron core is made up of stacked silicon steel sheets or an integral steel block.

Preferably, the said angular displacement sensor is a potentiometer type or Hall type angular displacement sensor.

In accordance with another aspect of the present invention, the said electronic control unit ECO controls the on-off electric current of the electromagnetic coil on the basis of the signal from the angular displacement sensor.

In an exemplary embodiment, on the basis of the number of the rotor iron cores or the stator iron cores, the times of on-off electric current during one round of the crankshaft are variable under the control of the said electronic control unit ECO.

Preferably, when the number of the said stator iron cores is two, the times of on-off electric current during one round of the crankshaft are each two under the control of the said electronic control unit ECO.

Preferably, when the number of the said stator iron cores is three, the times of on-off electric current during one round of the crankshaft are each three under the control of the said electronic control unit ECO.

Preferably, when the number of the said stator iron cores is four, the times of on-off electric current during one round of the crankshaft are each four under the control of the said electronic control unit ECO.

Preferably, when the number of the said stator iron cores is five, the times of on-off electric current during one round of the crankshaft are each five under the control of the said electronic control unit ECO.

BRIEF DESCRIPTION OF DRAWINGS

Preferred but not limited embodiments according to the present invention will be described. These and other characters, aspects and advantages of the present invention will be obvious when it is in detail described with reference to the drawings.

FIG. 3 is a right side view of an engine of the air-powered generator system with the electromagnetic auxiliary power unit in FIG. 1;

FIG. 4 is a left side view of an engine of the air-powered generator system with the electromagnetic auxiliary power unit in FIG. 1;

FIG. 5 is a top view of an engine of the air-powered generator system with the electromagnetic auxiliary power unit in FIG. 1;

FIG. 13B is a front view of FIG. 13A;

FIG. 13C is a central sectional view of FIG. 13A;

FIG. 14A is a perspective view of another preferred embodiment of the electromagnetic auxiliary power unit of the air-powered generator system with the electromagnetic auxiliary power unit in FIG. 1, which illustrates that the rotor and the stator each has three iron cores;

FIG. 14B is a front view of FIG. 14A;

FIG. 14C is a central sectional view of FIG. 14A;

FIG. 15A is a perspective view of another preferred embodiment of the electromagnetic auxiliary power unit of the air-powered generator system with the electromagnetic auxiliary power unit in FIG. 1, which illustrates that the rotor and the stator each has four iron cores;

EMBODIMENTS

The following description is exemplary only, and it is in no way to restrict the disclosure, the application and the utilization. It should be understood that the corresponding reference symbols indicate the same or corresponding components and characters in all drawings.

Before describing the embodiments of the present invention in detail, the energy of a compressed air engine is theoretically analyzed first.

Figure 12A:
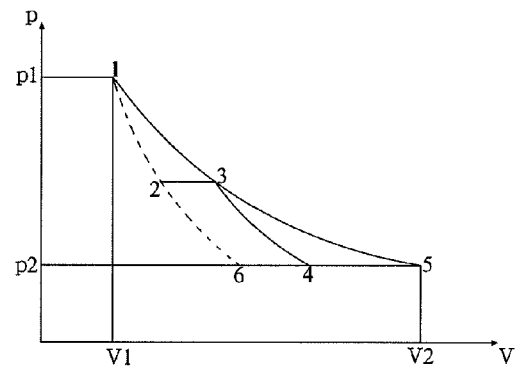
FIG. 12A is a P-V diagram of a compressed air-powered engine illustrating a serial multiple-stage type of the compressed air power distribution.
Figure 12B:
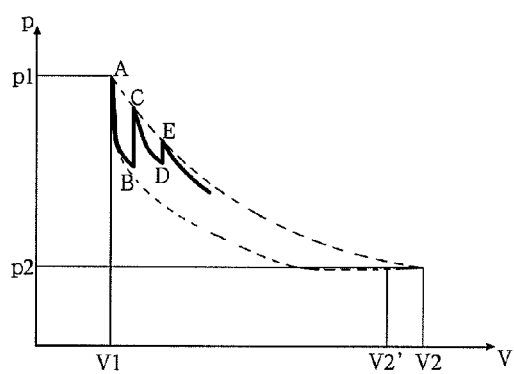
FIG. 12B is a P-V diagram of a compressed air-powered engine illustrating a parallel multiple-stage type of the compressed air power distribution.

The working process of the compressed air engine is simple, and there is only the procedure of the expansion and doing work of the compressed air. As shown in FIG. 12A, the curve 1-5 indicates the procedure of the constant temperature expansion of the compressed air, and the curve 1-6 indicates the procedure of the adiabatic expansion of the compressed air. The compressed air in the engine can't work at the absolute constant temperature, as it is always located between the constant temperature procedure and the adiabatic procedure. And in order to improve the energy utilization efficiency of the compressed air, the multiple-stage adiabatic procedure is adopted to approximate the adiabatic procedure, or the multiple-stage constant volume heat absorption procedure is adopted to approximate the constant temperature procedure. FIG. 12A illustrates the two stages expansion working procedure 1-2-3-4 of the compressed air. Curves 1-2 and 3-4 indicate working in a first cylinder and a second cylinder individually. After the adiabatic expansion and doing work in the first stage, the working medium absorbs heat at the constant pressure through a heat exchanger (2-3), after returns the initial temperature, and then expands and does work in the second cylinder. Theoretically, the working process of the engine can be regarded as the constant temperature expansion procedure approximately, and the area surrounded by the curve 1-5 and the coordinate values $V_1 \square V_2$ indicates the gas expansion work when the stored energy of the compressed air is released. But in FIG. 12B, the curves 1, 2 in the diagram indicate the constant temperature expansion procedure and the adiabatic expansion procedure individually, and the actual decompression expansion procedure is located between the curves 1, 2. Point A in the view is the initial point, points B, C, D, E are multiple-stage pressure points at the corresponding multiple-stage pressure control, and there are the constant volume heat absorption procedures at these points, such as BC and DE etc. Theoretically, the area surrounded by the curve 1 and the coordinate values $V_1 \square V_2$ indicate the gas expansion work when the stored energy of the compressed air is released.

It is assumed that the charged pressure of the high pressure tank is $p_1$. The whole expansion work when the volume $V_1$ of an ideal gas expands to the normal pressure $p_2$ at absolute constant temperature is shown as follows:

$$W = \int_{(p_1,V_1)}^{(p_2,V_2)} p \, dV (1), p_1 V_1 = p_2 V_2 \qquad (2)$$

Wherein $(p_1, V_1)$ and $(p_2, V_2)$ are the initial condition and the final condition individually, and the final condition after the adiabatic expansion is $(p_2, V_2')$.

Parameters of an engine from MDI Inc. France is selected that the initial storage pressure is p1=30 MPa, the storage volume is $V_1$=300 L, the final pressure at the ambient temperature is p2=0.1 MPa, and when we calculate from formulas (1) and (2), the whole expansion work between the initial condition and the final condition for the absolutely constant temperature expansion is W=51.334 MJ.

It is assumed that the operation temperature of the compressed air-powered engine is 300K, then the mass of the compressed air in the volume of 300 L under the pressure of 300 MPa is 104.553 kg. It is assumed that the mass of the gas tank is 100 kg, then the corresponding specific energy is about 75 W·h/kg. In comparison with the onboard battery such as a lead-acid battery and a nickel cadmium battery, the specific energy of the compressed air is higher, and it is almost equivalent to a nickel hydrogen battery, so the development potential is wide. With the development of large volume, high pressure and light mass of the high pressure gas tank, the specific energy of the compressed air will be improved largely, and it could be close to that of the sodium-sulfur battery and the lithium polymer battery.

The compressed air can work in two modes in the engine, i.e., the constant temperature expansion procedure and the adiabatic procedure. Their features will be illustrated by reference to the special parameter as follows.

We select the initial condition 1 (30 MPa, 300K) and the finish condition 2 (0.1 MPa, 300K), and calculate the expansion work of one unit mass of the compressed air in the constant temperature procedure and in the adiabatic procedure. The expansion work of one unit mass of the compressed air in the constant temperature procedure is W=491 kJ/kg, the expansion work of one unit mass of the compressed air in the adiabatic procedure is W'=242.3 kJ/kg. Known from the theoretical calculation, the expansion work in the constant temperature procedure is almost two times of the expansion work in the adiabatic procedure, so the energy utilization efficiency in the constant temperature procedure is higher than that in the adiabatic procedure, and theoretically the constant temperature procedure is ideal. But the "constant temperature" is hardly realized in the cylinder of the engine, and the second heat flow must be introduced in the engine wall of the engine to keep up enough heat, which increases the technical difficulty and results in complicated engine structure. Two power distribution modes of the compressed air engine will be further discussed from the standpoint of the energy utilization of the compressed air.

In the parallel mode, equivalent magnitude of the compressed air is input into each cylinder at the same time to expand and work. It is assumed that the initial condition 1 is (30 MPa, 300K), the finish condition 2 is (0.1 MPa, 300K), the compressed air expands at a constant temperature in the cylinder, the isothermal approximate ratio is $\eta$=80%, the number of the cylinders is four, and one unit mass of the compressed air inputted into the engine is 1 kg, so the total technical work of the gas in the whole four cylinders is:

$$\sum W_{TOL} = 4 \times \frac{W}{4} \eta$$
$$= 392.8 \, kJ/kg$$

$$V_2 = \left(\frac{p_1}{p_2}\right) V_1$$
$$= 300 V_1$$

Even though the constant temperature expansion procedure is the ideal working procedure, but the volume of the gas after expansion is 300 times of the volume before expansion. So the cylinder for working must have a large capacity. If using the cylinder of the existing engine as the cylinder after expansion, and the compression ratio is selected at 10, then:

$$p_2 = p_1 \left(\frac{V_1}{V_2}\right)$$
$$= 3 MPa,$$
$$W = 198.3 \, kJ/kg.$$

Obviously, the technical work reduces largely, it is lower than the technical work in the adiabatic expansion, and the residual pressure is high also, the energy can't be utilized enough. But the advantage of the parallel mode is that the structural dimension of each cylinder is the same, the layout is simple and the power output is stable. In view of the prior art, the cylinder can't keep the absolutely constant temperature, the compression ratio of the cylinder can't be too big, and the discharged compressed air after expansion and doing work has a high pressure yet, and it can work continuously, so utilizing multiple-stage adiabatic procedure or recycling the energy of the end gas by a closure loop is an actual and effective way at present.

In the series mode, the compressed air adiabatically expands and works in each cylinder in turn, and the discharged gas of the cylinder in the previous stage offers the initial pressure of the cylinder in the next stage. Known from the theoretical analysis: the more stages in series are used, i.e., the more cylinders in series are used, the more work one unit mass of the compressed air can do, and the energy utilization ratio is higher, generally, when four stages are in series, 80% of the work in the absolutely constant temperature can be achieved. The most difficult problem of the series cylinders is that the volume of the cylinder in the next stage is required to be larger than the volume of the cylinder in the previous stage, and heat exchangers should be placed between the cylinders in the different stages for absorbing heat at a constant pressure. So the size of the engine will be large more and more, which may affect the integral layout of the equipment using the compressed air engine.

It can be seen from above analysis that the compressed air engine is different from the traditional fuel engine and the electro-powered device, and its principle is feasible and meets the continuable development strategy of environmental protection and saving resource. And the source of the compressed air is easy to obtain, the energy storage method will gain an advantage over the electrical or hydraulic form. The power distributive modes each has it's advantage and defect, and improving the utilization efficiency of the compressed air and increasing the volume of the high pressure tank and the charged pressure are the main measures of improving the continuous working time once charged. When the volume of the tank and the charged pressure are determined relatively, the energy utilization efficiency η of the compressed air is the maximally changeable parameter. And the engine structure optimization, the recycle of the end gas's energy, the compressed air distribution and the like are the questions to be intensively studied.

From the above theoretic studies, the present applicant utilizes the parallel power distribution mode of the compressed air. In order to improve the energy utilization efficiency of the compressed air and using the pressure of the discharged gas after working, the applicant utilizes an end gas recycle loop. And in order to improve the rotary feature at high speed and the stable torque output at slow speed of the engine, the applicant utilizes a crankshaft auxiliary power device. The special embodiments of the present invention are described in detail.

Figure 1:
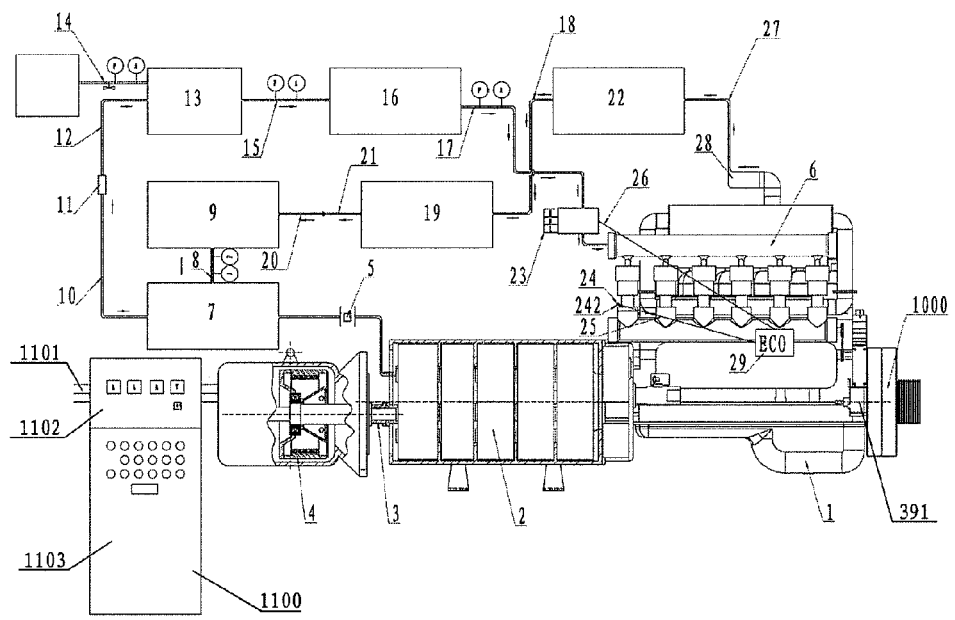
FIG. 1 is an overall schematic view of an air-powered generator system with an electromagnetic auxiliary power unit in accordance with the present invention.

Now referring to FIG. 1, FIG. 1 is an overall schematic view of an air-powered generator system with an electromagnetic auxiliary power unit in accordance with the present invention. Arrows in the figure show the flow direction of the air flow. In FIG. 1, the air-powered generator system with an electromagnetic auxiliary power unit includes an engine 1, a multiple-column power distributor 2, a generator system 4, a power distribution device 1100, a controller system 6, an air compressor 7, a condenser 11, an end gas recycle tank 9, a high pressure gas tank set 13, a constant pressure tank 16, an intake speed control valve 23, an electro-drive turbine unidirectional suction pump 19, an electronic control unit ECO 29 and an end gas muffler 22. As shown in FIG. 1, the high pressure air tank set 13 is connected to an external charge station or an external charge device via a compressed air intake pipeline 14 for receiving the requisite high pressure compressed air from an outside device. A flow meter A, a pressure meter P and a manual control switch (not shown) are placed on the compressed air intake pipeline 14. The flow meter A is adapted to measure and monitor the flow rate of the compressed air entering into the high pressure gas tank set 13, while the pressure meter P is adapted to measure and monitor the pressure of the compressed air entering into the high pressure gas tank set 13. When the high pressure gas tank set 13 needs to be charged through the external charge device or external charge station, the manual control switch is turned on, the high pressure compressed air enters into the high pressure gas tank set 13. When the readings of the flow meter A and the pressure meter P on the compressed air intake pipeline 14 reach the defined values, the manual control switch is turned off, and the charge procedure of the high pressure gas tank set 13 is finished. So the compressed air at the nominal pressure such as 30 MPa is acquired. In order to assure the safety of the gas tank, one or two or more safe valves (not shown) are placed on the high pressure gas tank set 13.

The high pressure gas tank set 13 may be made up of one or two or three or four or more high pressure gas tanks with enough volume in series or in parallel, and the number of the high pressure gas tanks of which the high pressure gas tank set 13 is made is determined on the basis of the actual demand in the application. The high pressure gas tank set 13 is connected to the constant pressure tank 16 via a pipeline 15, a flow meter A and a pressure meter P for monitoring and controlling the flow rate and the pressure of the compressed air are also placed on the pipeline 15. The constant pressure tank 16 is adapted to stabilize the pressure of the high pressure air from the high pressure gas tank set 13, and the pressure in the constant pressure tank 16 is slightly lower than the pressure in the high pressure gas tank set 13, such as between 21-28 MPa, preferably about 21 MPa. A pipeline 17 is placed between the constant pressure tank 16 and the intake speed control valve 23, and a flow meter A and a pressure meter P for monitoring and controlling the flow rate and the pressure of the compressed air are also placed on the pipeline 17. After controlled and adjusted by the intake speed control valve 23, the high pressure air from the constant pressure tank 16 enters into the controller system 6.

Now, the intake speed control valve 23 is described in detail. The function of the intake speed control valve 23 is to control the opening time of an electromagnetic valve on the basis of the command signal from the electronic control unit ECO 29 for determining the compressed air intake quantity. Because of the decompression function of the electromagnetic valve, the electromagnetic valve is combined with a decompression and pressure adjustment valve to form a speed control valve. Therefore the rotary speed of the engine can be adjusted in a suitable range. The intake speed control valve 23 is controlled by the control signal 26 from the ECO 29. Many kinds of sensors are optionally placed in the engine 1, such as a speed sensor for measuring the rotary speed of the engine, a position sensor for deciding the position of the top dead point of the cylinder, an oil valve potentiometer for deciding the position of an oil valve pedal and a temperature sensor for measuring the temperature of an engine block. In accordance with an exemplary embodiment of the present invention, a speed sensor 24 and/or an oil valve potentiometer 242 are shown. The speed sensor 24 may be a variety of speed sensors for measuring the rotary speed of the engine in the prior art, and generally it is placed on the crankshaft 56. The oil valve potentiometer 242 may be a variety of position sensors for measuring the position of the oil valve pedal in the prior art, and generally it is placed in the position of an oil valve pedal. When in a non-vehicle application, an engine load sensor may be analogous to the oil valve potentiometer of the oil valve position, such as a torque sensor for monitoring the outputting torque of the engine, a position sensor of an electric current selector knob for controlling the generation current and so on. ECO 29 could calculate on the basis of a speed signal of the speed sensor 24 and/or a position signal of the oil valve potentiometer 242, and send out a control signal 26. The intake speed control valve is controlled by the control signal 26, so the intake speed control valve can meet the demand of high speed, middle speed or low speed, and the engine can rotate at high speed, middle speed or low speed accordingly.

The high pressure compressed air passing through the intake speed control valve flows into controller system 6 via a high pressure pipeline, and the high pressure compressed air is supplied to each cylinder of the engine by means of the controller system 6, the pressure is about 7-18 MPa for example, preferably 9-15 MPa, more preferably 11-13 MPa, so as to drive a piston 51 of the engine to reciprocate in a cylinder system 40 (as shown in FIGS. 2-6), and the reciprocating movement of the piston 51 can be converted to the rotary movement of the crankshaft 56 by means of the linkage 54, so the demand for every condition of the engine can be met. The special structure of the controller system 6 will be described later in detail.\

With reference to FIG. 1 again, the rotary movement outputted from the engine 1 is distributed to application equipments by means of the multiple-column power distributor 2. As shown in FIG. 1, the application equipments include the air compressor 7 and the generator system 4. The air compressor 7 may be a traditional vane type compressor or a piston type compressor etc. It also may be a pressurizer unit disclosed in the patent document (CN201261386Y) of the present applicant. Generator system 4 may be a DC or AC generator known in the art, and it also may be another type of generator such as a rare earths permanent magnetism generator set without an iron core. In a preferred embodiment of the present invention, the generator system 4 is a rare earths permanent magnetism generator set without an iron core. The generator system 4 is electrically connected to a power distribution device 1100 by a connecting device such as a power distribution circuit. The power distribution device 1100 is adapted to distribute the electric power outputted from the generator system 4 to varieties of power utilization environment and power utilization devices such as an upper control panel 1102, a bottom control panel 1103 and an output terminal 1101 of power supply. The upper control panel 1102 includes three ampere meters indicated by symbol "A", a volt meter indicated by symbol "V" and a voltage changeover switch indicated by symbol "LWS". Each ampere meter shows the electric current of one phase in the three-phase circuit. The voltage changeover switch is adapted to optionally output the electric power from the generator system 4, and in accordance with the ordinary demand of the industry and civilian use, the voltage changeover switch of the present invention can switch between 220V and 380V. When the voltage changeover switch is selected to the position of 220V, the distribution device 1100 supplies the 220V electric power to varieties of power utilization environment, and when the voltage changeover switch is selected to the position of 380V, the distribution device 1100 supplies the 380V electric power to varieties of power utilization environment. In an exemplary embodiment of the present invention, the voltage changeover switch is a LW5/YH2/2 type changeover switch. The voltage meter measures a phase voltage or a line voltage on the basis of the operation of the voltage changeover switch.

The multiple-column power distributor 2 may connect with the flywheel on the crankshaft, and it also may connect with a connecting device of a coupler for example. The multiple-column power distributor 2 divides the power into two branches, one branch power is distributed to the power equipment 4, the other branch power is distributed to the air compressor 7. The power equipment 4 is connected to the multiple-column power distributor 2 by the connecting device such as a clutch 3 or the like, and the air compressor 7 is connected to a multiple-column power distributor 2 by the coupler 5 such as a gear. When the engine is set in operation, the rotation of the crankshaft 56 drives the multiple-column power distributor 2 to operate, and then the power is distributed to the power equipment 4 and the air compressor 7, so the power equipment 4 and the air compressor 7 is driven to work.

Because the compressed air engine of the present invention is driven directly by the high pressure air, the high pressure air drives the piston 51 to move during the crankshaft rotating 0-180 degrees. And when the piston continues to move upward due to the inertia after reaching the bottom dead point, the piston continues rotating 180-360 degrees, and the engine operates in the discharge stroke. Now the discharged gas has a high pressure yet, such as about 3 MPa. On the one hand, the discharged gas with the high pressure is prone to form a high pressure end gas flow when directly discharged into the atmosphere and bring about the end gas noise. On the other hand, the energy of the compressed air is lost. So the end gas of the compressed air engine must be recycled. The end gas recycle structure is described as follows.

The end gas discharged by a discharge header 28 of the engine 1 is transported to an end gas muffler 22 via a pipeline 27, and the end gas after muffle treatment is drawn to the electro-drive turbine unidirectional suction pump 19 via a pipeline 18. A pipeline 20 is placed between the electro-drive turbine unidirectional suction pump 19 and an end gas recycle tank 9, and a one-way valve 21 is placed in the pipeline 20. The one-way valve 21 only allows the end gas flow from the electro-drive turbine unidirectional suction pump 19 to the end gas recycle tank 9, and the reverse flow isn't allowed. A flow meter A and a pressure meter P are placed on the pipeline 8 between the end gas recycle tank 9 and the air compressor 7 for detecting and monitoring the flow rate and the pressure of the end gas after being compressed by the air compressor individually. After being compressed by the air compressor 7, the pressure of the end gas increases remarkably, and it can reach about 20 MPa to about 30 MPa. Then the end gas enters into a condenser 11 via a pipeline 10. After being cooled by the condenser, the end gas may be directly transported into the high pressure gas tank set 13 via a pipeline 12, or the end gas may be transported into the high pressure gas tank set 13 after passing through an end gas filter (not shown in the figure). Alternatively, a one-way valve (not shown in the figure) may be placed in the pipeline between the condenser 11 and the high pressure gas tank set 13, and the clean end gas is allowed to unidirectionally flow into the high pressure gas tank set 13 after being pressurized. So after working, most of the high pressure compressed air for driving the piston 51 of the engine could be pressurized and purified by means of the end gas recycle loop (which includes the end gas muffler, the electro-drive turbine unidirectional suction pump, the end gas recycle tank 9, the air compressor 7, the condenser 11 and the connecting pipeline therebetween) and then recycled back to the high pressure gas tank set. Thus, the recycle of the end gas could be realized. The existence of the end gas recycle loop could not only considerably settle the problem of the noise pollution due to the end gas with a considerable pressure (generally about 3 MPa) discharged directly to the atmosphere, but also effectively alleviate the problem of the large volume demand for the high pressure gas tank set 13. In other words, for the high pressure gas tank set 13 with a given volume, the existence of the end gas recycle loop considerably increases the continuous working period of the compressed air engine. And in a vehicle or a generator using the compressed air engine, the continuous working period of the vehicle or the generator is increased considerably, and the efficiency of the compressed air engine is improved remarkably.

Figure 2:
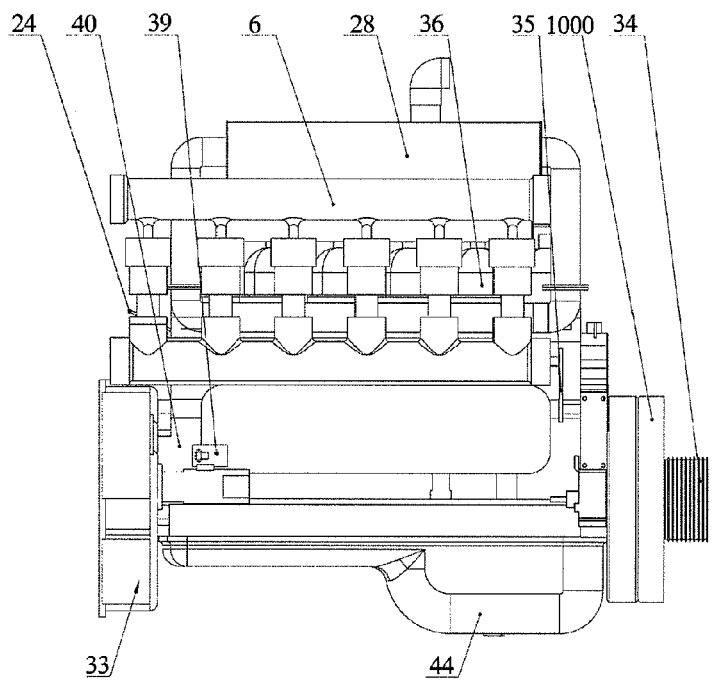
FIG. 2 is a front view of an engine of the air-powered generator system with the electromagnetic auxiliary power unit in FIG. 1.
Figure 6:
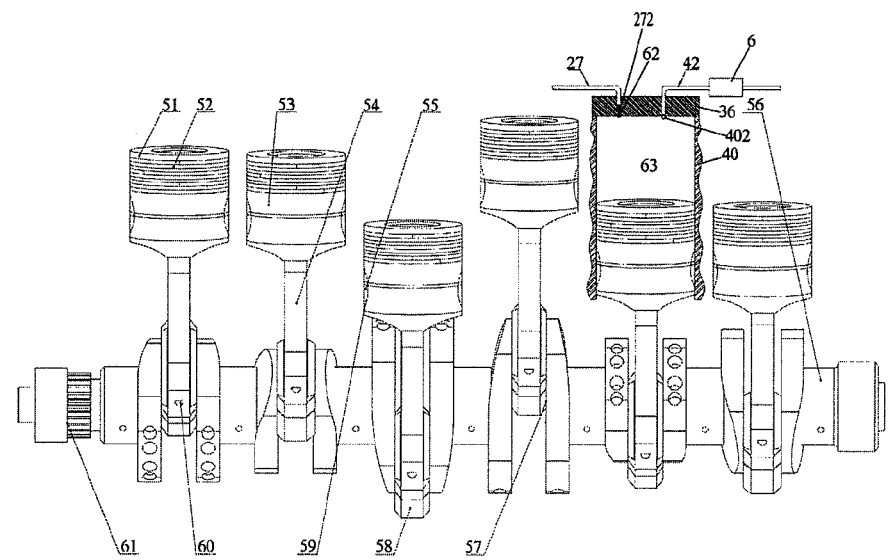
FIG. 6 illustrates a crankshaft-linkage-piston assembly of the engine of the air-powered generator system with the electromagnetic auxiliary power unit in FIG. 1, in which shows connection between one of piston-linkage units and the cylinder body.
Figure 8:
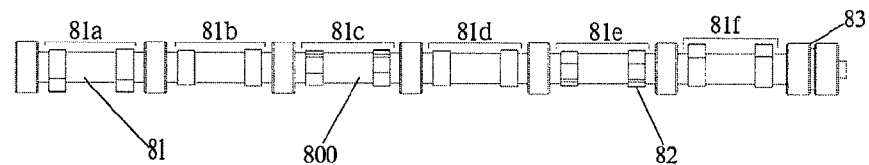
FIG. 8 is a structural schematic view of a camshaft of the engine in FIG. 2.

Now returning to FIGS. 2-5, FIGS. 2-5 illustrate the view of the engine 1 in FIG. 1 from different view points. Wherein FIG. 2 is a front view of the engine, FIG. 3 is a right side view of the engine 1, FIG. 4 is a left side view of the engine 1, and FIG. 5 is a top view of the engine 1. With reference to FIG. 6, the engine 1 includes the cylinder 40, a cylinder head system 36, the intake pipeline 42 (an intake valve throat), the discharge pipeline 27, the piston 51, the linkage 54, the crankshaft 56, a discharge camshaft 800 (as shown in FIG. 8), an intake camshaft 200 (which is mounted in an intake camshaft mounting hole 113 in FIG. 9), a front gear box system 43, a back gear box 33 and the electromagnetic auxiliary power unit 1000. The front gear box system 43 is adapted to drive the crankshaft 56 and the camshaft. A gear ring 31 and a flywheel 32 which can be connected with the multiple-column power distributor 2 are positioned in the back gear box 33. An intake camshaft 200 and a discharge camshaft 800 are positioned in the exemplary embodiment of the engine 1. They are connected to the crankshaft 56 by the front gear box system 43, and they can rotate suitably along with the crankshaft 56. Because the compressed air intake is controlled and distributed by the controller system 6 directly, the intake valve on the cylinder head system 36 of the engine is eliminated, and only the exhaust valve 62 is positioned thereon. In the exemplary embodiment, each cylinder has four exhaust valves, and the number of the exhaust valves can be one, two, four or six as required. The compressed air from the controller system 6 enters directly into the expansion and discharge chamber 63 through the valve throat 42 (see FIG. 6), and when the engine is working, the compressed air pushes the piston 51 to move downwards. The linear movement of the piston 51 is converted to the rotary movement of the crankshaft 56 by means of the linkage 54, and the output of the engine can be realized by the rotation of the crankshaft. After the piston 51 reaches the bottom dead point, the crankshaft 56 continues moving due to the inertia, and drives the piston 51 to move from the bottom dead point to the top dead point. Now, the discharge camshaft 800 can open the discharge valve 62 by means of the cam thereon and the corresponding rocker, and the discharge stroke is done. In the exemplary embodiment, the discharged end gas preferably enters into the end gas recycle loop.

A starter 39 for starting the engine, a generator 391 which is connected to the crankshaft by a connecting component such as a belt pulley, a cylinder block oil bottom house 44 for the oil return and an engine oil filter 2 for filtering the engine oil are placed on the engine 1. The generator 391 may be for example an integral AC generator, a brushless AC generator, an AC generator with a pump or a permanent magnet generator and so on. When the engine works, the generator can supply power to the engine assembly and charge a battery cell or an accumulator cell (not shown in the figures).

Figure 7:
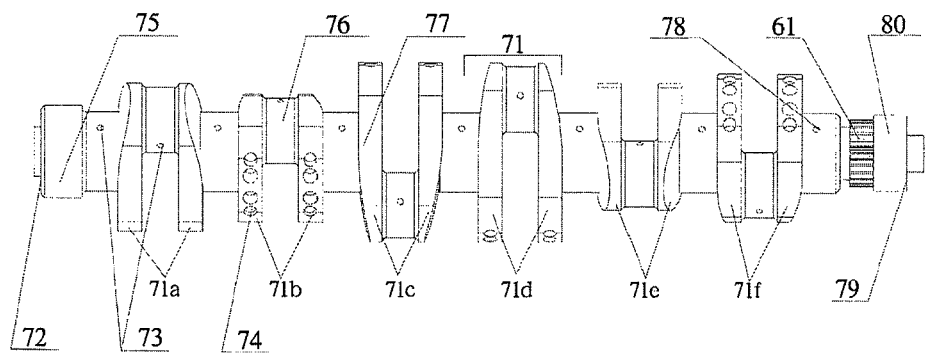
FIG. 7 is a structural schematic view of a crankshaft unit of the crankshaft-linkage-piston assembly in FIG. 6.

Now with reference to FIG. 6, the FIG. 6 illustrates the crankshaft-linkage-piston system of the engine of the air-powered generator system with the electromagnetic auxiliary power unit in FIG. 1, wherein the connection of one piston-linkage unit and the cylinder 40 is shown. In the illustrative embodiment, there are six cylinders 40 preferably, and correspondingly there are six pistons 51 and six linkages 54. Alternatively, the numbers of the pistons 51, the cylinders 40 and the linkages 54 can be one, two, four, six, eight, twelve or the others as desired by the skilled in the art. Correspondingly, the crankshaft 56 must be designed matchedly for accommodating the number of the piston-linkage units. In the illustrative embodiment, as shown in the FIG. 6 and FIG. 7, preferably, the crankshaft 56 has six unit bell cranks, which corresponds with the preferable embodiment of the present invention. With reference to FIG. 6 again, in the shown connection of one piston-linkage unit and the cylinder 40, the high pressure compressed air from the controller system 6 enters into the expansion and discharge chamber 63 via the intake pipeline 41 through a gas throat hole 402 on the cylinder head 36. The high pressure gas expands in the expansion and discharge chamber 63 and does work, and pushes the piston 51 to move downwards, so it is the working stroke. The outputting work in the working stroke may be supplied outwards through the crankshaft and linkage system. When the piston 51 moves from the bottom dead point to the top dead point in the cylinder, the discharge valve 62 is opened, the air under a pressure is discharged from the expansion and discharge chamber via the discharge pipeline 27, and which is the discharge stroke. Immediately before the piston reaches the top dead point, the discharge valve 62 is closed, the controller system 6 starts to supply the air to the expansion and discharge chamber 63, and the next cycle begins. Obviously, the engine does work once when the crankshaft 56 of the engine of the present invention rotates one round (360 degrees), and it isn't similar to the traditional four-stroke engine wherein the crankshaft could complete the whole strokes of the intake, the compression, the expansion and the discharge once when rotating two rounds (720 degrees). The present invention is similar to the two-stroke engine, but it is different from the two-stroke engine because generally an intake port is positioned at the bottom of the cylinder in the traditional two-stroke engine, and a scavenging port and a discharge port are placed at a suitable position in the cylinder. In the two-stroke engine of the present invention, the gas throat hole 402 for the intake of the high pressure compressed air and a discharge port 272 are placed on the top of the cylinder, and the opening and closure of the gas throat hole 402 is executed by the intake camshaft 200 via the controller system 6, and the opening and closure of the discharge port is executed by the discharge camshaft 800 which is driven by the crankshaft to rotate and though the opening and closure of the discharge valve 62 controlled by the rocker. So the two-stroke engine of the present invention is fully different from the traditional two-stroke engine; it utilizes effectively the high pressure air which can expand and do work directly, and the piston 51 does work once when the crankshaft 56 rotates one round (360 degrees). So the engine of the present invention can multiply the power one time in comparison with the traditional four-stroke engine when the rate of gas discharge is the same.

Now with reference to FIG. 5 and FIG. 6, the crankshaft includes a gear connecting bolt 79, a leading end 80 of the crankshaft, a bevel gear 61, a main journal 78, a unit bell crank 71, a balance weight 77, a crank pin 76, a trailing end 75 of the crankshaft and a flywheel connecting bolt 72. One or more engine oil holes for supplying engine oil to the crankshaft are placed on the main journal 78 and the crank pin 76 on the crankshaft 56. The gear connecting bolt 79 for connecting to the corresponding gear in the front gear box system 43 is placed on the right (as shown direction in the figures) of the leading end 80 of the crankshaft and at an adjacent position. The bevel gear 61 for driving the camshaft to rotate is placed on the left (as shown direction in the figures) of the leading end 80 of the crankshaft and at an adjacent position. The flywheel connecting bolt 72 for fixed connecting with the flywheel 32 is placed at the outside of the trailing end 75 of the crankshaft and at an adjacent position. One or two or more balance weight holes for adjusting the balance are placed on the balance weight 77. In the preferred embodiment of the present invention, the unit bell cranks 71 of the crankshaft include six unit bell cranks, i.e., a first unit bell crank 71*a*, a second unit bell crank 71*b*, a third unit bell crank 71*c*, a fourth unit bell crank 71*d*, a fifth unit bell crank 71*e* and a sixth unit bell crank 71*f*. They are corresponding to first to sixth linkages 54 or pistons 51. Alternatively, the number of the unit bell cranks 71 may be variable, such as one, two, four, six, eight or more as the skilled in the art know easily. In the preferable embodiment in the FIG. 6 and FIG. 7, the phase of each bell crank is set up as follows: the phase difference of the first bell crank 71*a* and the second bell crank 71*b* is 120 degrees, the phase difference of the second bell crank 71*b* and the third bell crank 71*c* is 120 degrees, the phase difference of the third bell crank 71*c* and the fourth bell crank 71*d* is 180 degrees, the phase difference of the fourth bell crank 71*d* and the fifth bell crank 71*e* is −120 degrees, the phase difference of the fifth bell crank 71*e* and the sixth bell crank 71*f* is −120 degrees. So the operations sequence of the unit bell cranks is set up as follows: the first and the fifth unit bell cranks work at the same time, then the third and the sixth unit bell cranks work together, and at last the second and the fourth unit bell cranks work together. So the operation sequence of the cylinders of the engine is set up as follows: 1-5 cylinders, 3-6 cylinders and 2-4 cylinders. In the teaching of the present invention, the unit bell cranks and their phase differences and operation sequence which are different from that of the present invention can be set up by the skilled in the art, and which would fall in the scope of the present invention.

With reference to FIG. 6, the piston 51 is connected to the crankshaft 56 by the linkage 54. The linkage 54 includes a small end of the linkage, a linkage body and a big end of the linkage. The big end of the linkage includes a linkage cover 58, a circular space is faulted in the linkage cover 58, so that the linkage cover 58 is connected to the crank pin 76 of the crankshaft by a bearing bush 57 of the linkage in the space. An oil stop ring 53 made from tetrafluoroethylene and a piston ring 53 made from tetrafluoroethylene are placed on the peripheral surface of the piston 51. In the illustrative embodiment, four oil piston rings 52 made from tetrafluoroethylene and two stop rings 53 made from tetrafluoroethylene are placed on each piston 51. Alternatively, the numbers of the oil stop rings 53 made from tetrafluoroethylene and the piston rings 53 made from tetrafluoroethylene can be two, three, four or more. The oil stop rings 53 made from tetrafluoroethylene have the function of stopping the oil, the piston rings 53 made from tetrafluoroethylene have the function of scraping off the oil, and they function together to assure the reliable lubrication and seal of the lubricant oil.

Now with reference to FIG. 8, FIG. 8 illustrates a structural schematic view of the discharge camshaft 800 of the engine 1 in FIG. 2. The discharge camshaft 800 includes a unit cam 81 and a sprocket wheel 83. In the illustrative embodiment, the unit cams 81 include six unit cams, i.e., a first unit cam 81*a*, a second unit cam 81*b*, a third unit cam 81*c*, a fourth unit cam 81*d*, a fifth unit cam 81*e* and a sixth unit cam 81*f*. Alternatively, the number of the unit cams 81 can be one, two, four, six, eight, twelve or more, and it is dependent on the number of the cylinders of the engine and the number of the discharge valves in each cylinder. In the illustrative embodiment of the present invention, each unit cam 81 includes two cams 82, and each cam 82 can control the opening of the corresponding discharge valve 62. In the preferred embodiment in FIG. 8, the phases of each cam 81 are set up as follows: the phase difference of the first unit cam 81*a* and the second unit cam 81*b* is 120 degrees, the phase difference of the second unit cam 81*b* and the third unit cam 81*c* is 120 degrees, the phase difference of the third unit cam 81*c* and the fourth unit cam 81*d* is 180 degrees, the phase difference of the fourth unit cam 81*d* and the fifth unit cam 81*e* is −120 degrees, the phase difference of the fifth unit cam 81*e* and the sixth unit cam 81*f* is −120 degrees. So the operation sequence of the unit cams is set up as follows: the first and the fifth unit cams work at the same time, then the third and the sixth unit cams work together, and at last the second and the fourth unit cams work together. So the operation sequence of the cylinders of the engine is set up as follows: 1-5 cylinders, 3-6 cylinders and 2-4 cylinders. In the teaching of the present invention, the unit cams and their phase differences and operation sequence which are different from that of the present invention can be set up by the skilled in the art, and which would fall in the scope of the present invention.

Figure 9A:
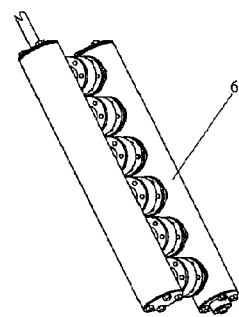
FIG. 9A is a perspective view of a controller system of the air-powered generator system with the electromagnetic auxiliary power unit in FIG. 1.
Figure 9B:
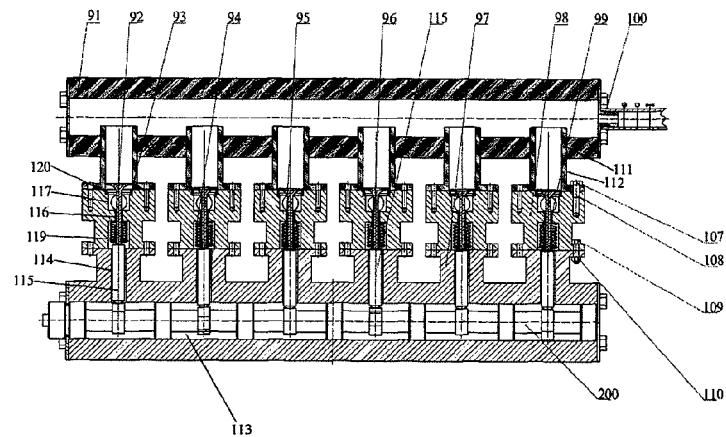
FIG. 9B is a longitudinal sectional view of the controller system in FIG. 9A.
Figure 9C:
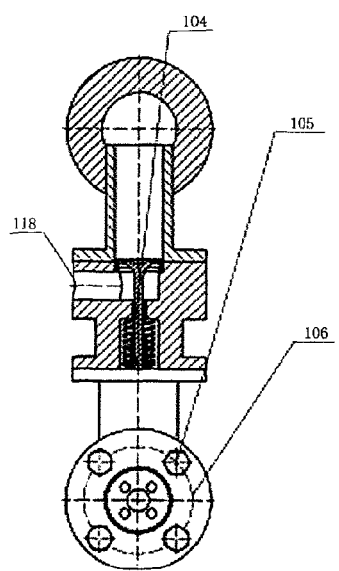
FIG. 9C is a transversal sectional view of the controller system.

Now with reference to FIG. 9, FIG. 9A-FIG. 9C are referred to as FIG. 9 together, and they are views of the controller system 6 of the air-powered generator system with the electromagnetic auxiliary power unit in FIG. 1. As shown in FIG. 9, the controller system 6 includes a high pressure common rail constant pressure pipe 91, a controller bottom base 97, a controller mid seating 89, a controller valve 92, a controller spring 94 and a controller upper cover 108. The high pressure common rail constant pressure pipe 91 has a cylindrical shape, but may be rectangular, triangular etc. The interior of the high pressure common rail constant pressure pipe 91 is a cylindrical channel, for example, for receiving the high pressure intake gas from the intake speed control valve 23, and the pressure of the compressed air in the channel is generally kept balanced, so that the high pressure air initially entering the expansion and discharge chamber 63 of each cylinder 40 is under the same pressure, which makes the engine work stably. End covers 100 of the high pressure common rail constant pressure pipe are fixedly assembled on two ends of the high pressure common rail constant pressure pipe 91, and the end cover 100 connecting with the intake speed control valve 23 has a projecting flange (not marked in the figures). The flange extends into a pipeline between the high pressure intake speed control valve 23 and the high pressure common rail constant pressure pipe 91, and is fixedly connected to the high pressure pipeline removably by the means of threaded coupling for example. The end covers 100 of the high pressure common rail constant pressure pipe are connected to the high pressure common rail constant pressure pipe 91 by end cover connecting bolts. Upper cover connecting holes 111 whose number is corresponding to that of the cylinders are placed on the high pressure common rail constant pressure pipe, and in the illustrative preferred embodiment, the number of the upper cover connecting holes 111 are six. The cross sectional shape of the controller upper cover 108 along the central line thereof is an inverted T-shape. There are a cylindrical branch intake pipeline and a circular under surface (not marked in the figures). The branch intake pipeline 112 is connected in the upper cover connecting hole 111 by means of a male thread on the top end thereof, so it is fixedly connected to the high pressure common rail constant pressure pipe 91 removably. The controller upper cover 108 is fixedly connected to the controller mid seat 98 hermetically and removably by connecting bolts for the upper cover and the mid seat or other fastener. The controller mid seating is fixedly connected to the controller bottom base 97 hermetically and removably by connecting bolts 110 of the mid seat and the bottom base or other fastener.

As shown in FIG. 9, many holes with different diameters are placed in the center of the controller mid seat 98, and they are a controller valve seat hole 120, a controller valve hole 117, an oil seal bush hole 116 and a controller valve spring hole 119 in turn from top to bottom. In the illustrative embodiment, the diameter of the hole 120 is larger than the diameter of the hole 117 and the diameter of the hole 116. The diameter of the hole 117 is larger than the diameter of the hole 116. The diameter of the hole 119 may or may not be the same of the hole 117, but it is larger than the diameter of the hole 116. In a preferred embodiment, the diameter of the hole 119 is equal to the diameter of the hole 117, but a little smaller than the diameter of the hole 120. The controller valve seat is mounted in the controller valve seat hole 120 and supported on the controller valve hole 117. The controller valve hole 117 is a hollow cavity, and it is communicated with a gas throat hole connecting hole 118, so that when the controller valve is opening, the compressed air from the high pressure common rail constant pipe 91 enters into the gas throat hole connecting hole 118 through the branch intake pipeline 112. One end of the gas throat hole connecting hole 118 is communicated with the controller valve hole 117, the other end of the gas throat hole connecting hole is communicated with the gas throat hole 402 of the cylinder head system 36, and the hole is kept normally open, so that when the controller valve 92 is opening, the compressed air is sent to the expansion and discharge chamber 63 and drives the engine to do work. An oil seal bush 99 is mounted in the oil seal bush hole 116 and supported on the controller valve spring 94, and a valve stem (not marked in the figures) of the controller valve 92 passes through the interior of the oil seal bush 99. The oil seal bush 99 has the function of guiding the valve stem besides the function of sealing the controller valve 92. The control valve spring 94 is mounted in the controller valve spring hole 119, and its bottom end is supported on a controller valve spring bottom seating 95 and fixed on the controller valve spring bottom seat 95 by a controller valve lock jaw. When the engine does not work, the controller valve spring 94 is preloaded with a pretension, which pushes the controller valve 92 against the controller valve seating 93, and the controller valve 92 is closed.

Six illustrative controller tappet mounting holes 114 are placed in the controller bottom base 97, and a variable number of controller tappet mounting holes 114 can be set up on the basis of the number of the cylinders of the engine, such as one, two, four, six, eight, ten or more. The controller tappet 115 is mounted in the controller tappet mounting hole 114, and follows along with the rotation of the intake camshaft 200 mounted in the intake camshaft mounting hole 113 to reciprocate up and down. When the cylinder 40 of the engine needs to be supplied the high pressure compressed air, the controller tappet 115 is jacked up by the cam of the intake cam shaft 200, and then the controller tappet 115 jacks up the valve stem of the controller valve 92, so that the valve stem overcomes the drag force of the controller valve spring 94 and moves away from the controller valve seat 93. Thus, the controller valve is opened, the high pressure compressed air enters the expansion and discharge chamber 63 through the high pressure common rail constant pressure pipe 91 to meet the need of gas supply of the engine. After the intake camshaft 200 rotates through an angle along with the crankshaft 56, the valve stem of the controller valve 92 is repositioned on the controller valve seating 93 under the restoring reaction of the controller valve spring 94, the controller valve 92 is closed, and the air supply is finished. Because the compressed air engine of the present invention is a two-stroke engine, the controller valve 92 and the discharge valve 62 each is opened and closed once when the crankshaft 56 rotates one round, so that the cam phases of the intake camshaft 200 and the discharge camshaft 800 and their connection relation with the crankshaft are set up easily. The detailed structure and movement transmission is illustrated in FIG. 10.

Figure 10A:
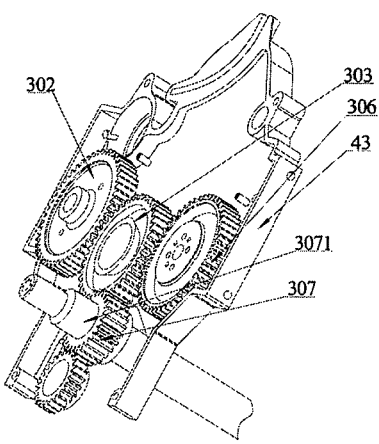
FIG. 10A is a perspective view of a front gear box system of the air-powered generator system with the electromagnetic auxiliary power unit in FIG. 1.
Figure 10B:
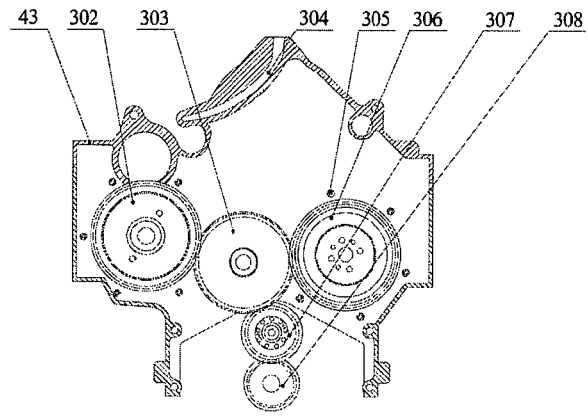
FIG. 10B is a left side view of FIG. 10A.
Figure 10C:
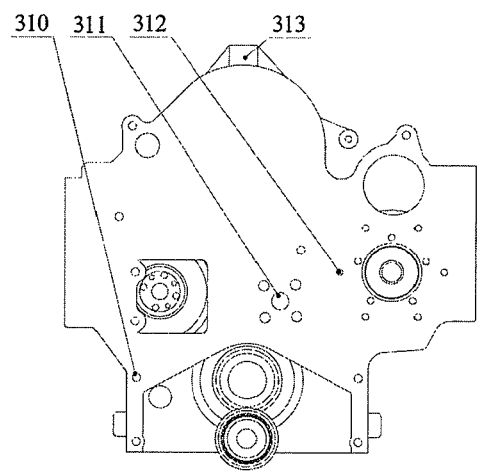
FIG. 10C is a partial sectional right side view of FIG. 10A.

Now with reference to FIG. 10, FIG. 10A-FIG. 10C are referred to as FIG. 10 together, and they are different views of the front gear box system 43 of the air-powered generator system with the electromagnetic auxiliary power unit in FIG. 1. As shown in FIG. 10, the front gear box system includes a polygonal cover 313, a transmission gear 308, a crankshaft gear 307, a bridge gear 303, an intake camshaft gear 302 and a discharge camshaft gear 306. The camshaft gear 307 is fixedly connected to one end of the crankshaft 56 passing through the polygonal cover 313, so that the rotation is transmitted from the crankshaft. A projecting end 3071 (which is referred to as a camshaft extension end) of the crankshaft 56 on the other side of the polygonal cover 313 is adapted to connect with the electromagnetic auxiliary power unit 1000, and the electromagnetic auxiliary power unit 1000 supplies with the auxiliary power for the rotation of the crankshaft 55 so as to improve the performance of the engine. The detailed structure and the working process of the electromagnetic auxiliary power unit 1000 will be described later.

The transmission gear 308 which is an engine oil pump gear, for example, is placed under the crankshaft gear 307 (the orientation shown in FIG. 10B), so as to drive the component of the engine oil pump to rotate by means of the transmission gear 308. The intake camshaft gear 302, the bridge gear 303 and the discharge camshaft gear 306 are placed above the crankshaft gear 307 in turn from left to right (the orientation shown in FIG. 10B). The crankshaft gear 307 is engaged with the bridge gear 303 to drive the bridge gear 303 to rotate. The bridge gear 303 is engaged with the intake camshaft gear 302 and the discharge camshaft gear 306 on the left side and the right side simultaneously, so that the intake camshaft gear 302 and the discharge camshaft gear 306 are driven to rotate via the crankshaft gear 307 and the bridge gear 303 when the crankshaft 56 rotates, which causes the intake camshaft 200 and the discharge camshaft 800 to rotate, and ultimately the opening and the closure of the intake valve 62 and the controller valve 92 are realized. In the illustrative embodiment, the discharge camshaft gear 306 is fixedly connected to the discharge camshaft 800 directly, so the rotation of the discharge camshaft gear 306 directly makes the discharge camshaft 800 rotate. A belt pulley (not shown) is fixed in a suitable position on the central shaft of the intake camshaft gear 302. The belt pulley is connected to a belt pulley placed on the intake camshaft 200 by a camshaft transmission belt 35, so the intake camshaft 200 is driven to rotate, and the opening and the closure of the controller valve 92 are realized. Alternatively, a sprocket wheel (not shown) may also be fixed in a suitable position on the central shaft of the intake camshaft gear 302. The sprocket wheel is connected to a sprocket wheel placed on the intake camshaft 200 by a chain, so the intake camshaft 200 is driven to rotate, and the opening and the closure of the controller valve 92 are realized.

Many holes for different functions are placed in the polygonal cover 313, such as screw connecting holes 309, screw holes 310 and bolt connecting holes 311. The polygonal cover 313 is connected to the engine block via the screw connecting holes 309, the bridge gear 303 is connected to the polygonal cover 313 via the screw holes 310, and the bolt connecting holes 311 are used to connect the polygonal cover 311 with the engine block. The bolt connecting holes 311 may be welded in a welding post 5 on the polygonal cover 311. An oil hole 304 for the lubricant oil flow and a hoisting ring base are also placed in the polygonal cover 311.

Figure 11A:
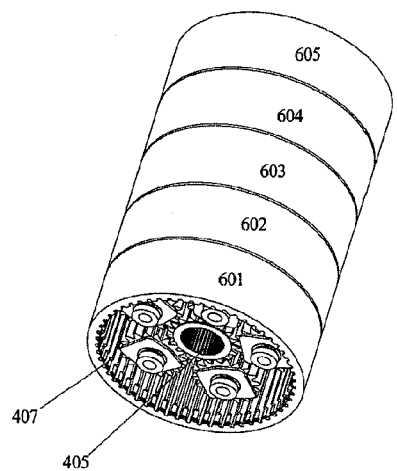
FIG. 11A is a perspective view of a multiple-column power distributor of the air-powered generator system with the electromagnetic auxiliary power unit in FIG. 1.
Figure 11B:
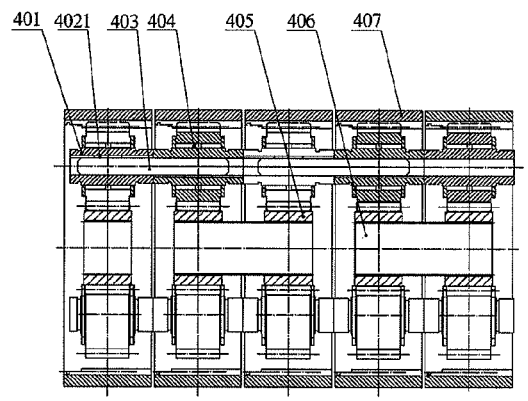
FIG. 11B is a transversal sectional view along a longitudinal sectional line in FIG. 11A.
Figure 11C:
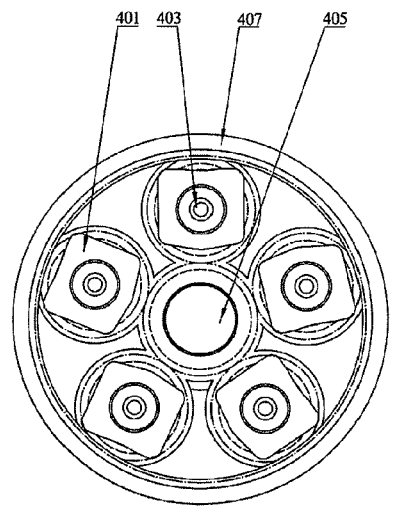
FIG. 11C is a left side view of FIG. 11A.
Figure 11D:
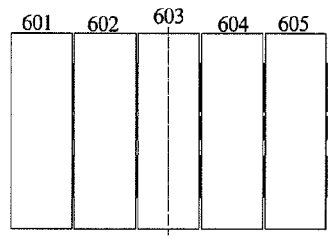
FIG. 11D is a top view of FIG. 11A.

Now with reference to FIG. 11, FIG. 11A-FIG. 11C are referred to as FIG. 11 together, and they are different views of the multiple-column power distributor 2 of the air-powered generator system with the electromagnetic auxiliary power unit in FIG. 1. As shown in FIG. 11, in the illustrative embodiment of the present invention, the multiple-column power distributor 2 is a multiple-stage power distributor, and it is made up of a first stage 601, a second stage 602, a third stage 603, a fourth stage 604 and a fifth stage 605 (from left to right shown in FIG. 10B). Alternatively, the multiple-column power distributor may be made up of the stages other than five stages in the embodiment, such as three stages, four stages, six stages or seven stages. The structure of every stage is basically the same, and each stage includes a planetary gear 401, an inner gear ring 407 and a sun gear 405. The number of the planetary gears 401 in every stage can set up equally, such as three, five, seven or more. In the illustrative embodiment, each stage includes five planetary gears 401 distributed uniformly. The benefit thereof is that the load of the main shaft is distributed uniformly because of the uniform distribution of the planetary gear, and the transmission can be stable and the transmission power is high. As shown in FIG. 11B, the planetary gears 401 in the first stage 601 and the second stage 602 are connected by a planetary gear pin 403, so that the first stage 601 and the second stage 602 rotate synchronously. The planetary gear pin 403 is connected to the planetary gear 401 by a smooth flat key 4021 or a spline. In the illustrative embodiment, the planetary gear pin 403 may be a slender cylindrical pin, and it's shape also may be rectangular, trapezoidal and semicircular, and the number of the pins in every stage may be two, three, four, five or more. The sun gears in the second stage 602 and the third stage 603 is connected by a sun gear pin 406, so the united movement of the second stage 602 and the third stage 603 is realized. The connection relation of the third stage 603 and the fourth stage 604 is similar to the connection relation in the first stage 601 and the second stage 602, the connection relation of the fourth stage 604 and the fifth stage 605 is similar to the connection relation of the second stage 602 and the third stage 603. As such, the power transmission from the first stage 602 to the fifth stage 603 of the multiple-column power distributor 4 is realized, the power inputted from the first stage 601 may be outputted from the fifth stage 605. Particularly, the planetary gear 401 in every stage only spins around itself axis, and it does not revolve around the corresponding sun gear 405, so the inner structure of the multiple-column power distributor is simple and is liable to transmit power stably.

Now the operating principle of the multiple-column power distributor 2 is described. The flywheel 32 is placed on the crankshaft 51 of the engine 1, the gear ring 31 is fixed on the periphery of the flywheel 32, and the gear ring 31 has an outer gear ring which is engaged with the inner gear ring 407 with inner teeth on the first stage 601 of multiple-column power distributor 2 so as to transmit the movement of the crankshaft 56 to the inner gear ring 407 in the first stage 601. The planetary gear 401 in the first stage 601 is connected to the planetary gear in the second stage 602, the power is transmitted from the first stage 601 to the second stage 602, and the planetary gear 401 in the second stage 602 drives the sun gear in the second stage to rotate. The sun gear 405 in the second stage is connected to the sun gear in the third stage by a sun gear pin 406 and drives the sun gear 405 in the third stage to rotate, and the power is transmitted from the second stage 602 to the third stage 603. Being similar to the first stage 601, the third stage 603 transmits the power from the third stage 603 to the fourth stage 604 through the planetary gear 401. Being similar to the second stage, the fourth stage transmits the power from the fourth stage to the fifth stage through the sun gear 405. In the illustrative embodiment of the present invention, the rotary shaft of the planetary gear in the fifth stage 605 is the output end, the power is divided into many branches (in the illustrative embodiment, two branches) and transmitted to an element connected to the multiple-column power distributor 2. For example, in the illustrative embodiment of the present invention, the element is the power unit 4 of the generator and the air compressor 7. So the power is outputted from the crankshaft 56 of the engine, and multiple-branch output is realized by the multi-column power distributor 2. By comparison with the gear box of the traditional engine, five stages of the planetary gear are used to transmit power and re-distribute, so it can save labor and reduce the torque vibration during the transmission.

Figure 13A:
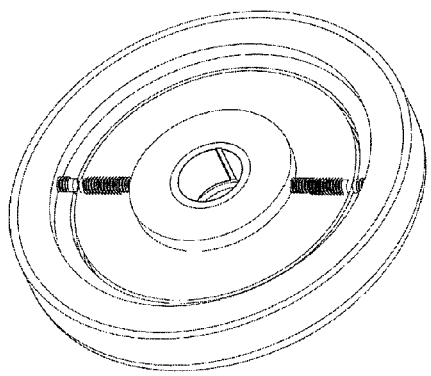
FIG. 13A is a perspective view of a preferred embodiment of the electromagnetic auxiliary power unit of the air-powered generator system with the electromagnetic auxiliary power unit in FIG. 1, which illustrates that the rotor and the stator each has two iron cores.

Now the detailed structure and operation principle of the electromagnetic auxiliary power unit 1000 are described. FIGS. 13-16 illustrate various embodiments of the electromagnetic auxiliary power unit 1000 of the present invention. In FIGS. 13-16, the same reference numbers refer to the entirely same component. Now with reference to FIGS. 13A-13C, FIG. 13A is a perspective view of a preferred embodiment of the electromagnetic auxiliary power unit of the air-powered generator system in FIG. 1, and FIG. 13A illustrates the condition that the rotor and the stator each has two iron cores. FIG. 13B is a front view of FIG. 13A, and FIG. 13C is a central sectional view of FIG. 13A. The electromagnetic auxiliary power unit 1000 includes an auxiliary power unit housing 1001, a stator portion and a rotor portion. The stator portion is made up of a stator iron core fixed disk 1002, a stator iron core 1004 and a stator iron core coil 1003. The rotor portion is made up of a rotor iron core fixed disk 1007, an auxiliary power unit flywheel 1008, a rotor iron core 1005 and a rotor iron core coil 1006. The shape of the electromagnetic auxiliary power unit 100 is cylindrical. The auxiliary power unit housing 1001 is placed outermost of the auxiliary power unit 1000, and it is formed of a magnetism insulation material such as iron. The stator iron core fixed disk 1002 is fixedly connected to the auxiliary power unit housing 1001, the stator iron core 1004 is inserted in and connected to the stator iron core fixed disk 1002, and the stator iron core coil 1003 is wound on the stator iron core.

The rotor iron core fixed disk 1007 is fixedly mounted on the auxiliary power unit flywheel 1008 by means of the interference fit or the threaded connection, so as to follow the auxiliary power unit flywheel 1008 to rotate. The rotor iron core 1005 is inserted in and connected to the rotor iron core fixed disk 1007, and the rotor iron core coil 1006 is wound on the rotor iron core. The auxiliary power unit flywheel 1008 is fixedly connected to the crankshaft 56 by a key 1009. In the illustrative embodiment of the present invention, the auxiliary power unit flywheel 1008 is fixedly connected to the crankshaft extension end 3071 by a spline, a flat key or a pin 1009. So the rotation of the crankshaft 56 drives the auxiliary power unit flywheel 1008 to rotate, and further drives the rotor iron core 1005 to rotate.

It is known from above description, the electromagnetic auxiliary power unit 1000 of the present invention has a separated body structure, i.e., the stator portion and the rotor portion are installed separately. Separated installation has the benefit of simplifying the structure of the electromagnetic auxiliary power unit 1000, and the installation, repair and maintenance of the rotor portion and the stator portion can be done individually. Though the electromagnetic auxiliary power unit 1000 of the present invention has a separated body structure, the rotor portion and the stator portion are cooperated to work well. As shown in FIG. 13C, the stator portion is fixedly connected to the auxiliary power unit housing 1001 by the stator iron core fixed disk 1002, for example by means of the threaded connection or the interference fit, i.e., there is not a movable relation between the stator portion and the auxiliary power unit housing 1001. The auxiliary power unit housing 1001 is fixedly connected to the polygonal cover 313 of the front gear box system 43 by fasteners such as bolts or screws passing through housing mounting holes, so the stator portion is fixed on the engine 1. The rotor portion follows the crankshaft 56 to rotate by means of the fixed connection of the auxiliary power unit flywheel 1008 and the crankshaft extension end 3071, so the stator portion and the rotor portion of the electromagnetic auxiliary power unit 1000 may operate concertedly.

In the structure of the electromagnetic auxiliary power unit shown in FIG. 13, the stator portion and the rotor portion both are made up of two iron cores, i.e., two stator iron cores 1004 spaced apart 180 degrees from each other and two rotor iron cores 1006 spaced apart 180 degrees from each other. As shown in FIG. 13B, in order that the electromagnetic fields produced by the rotor iron core coil 1006 of the rotor portion and the stator iron core coil 1003 of the stator portion are homopolar and the resulting repulsive action force pushes the crankshaft 56 to rotate, the stator iron core may be inclined suitably, for example the stator iron core is inclined at an acute angle of 5°-30° relative to the extension line of the rotor iron core. Preferably, the inclined angle is 10°-25°, more preferably, the inclined angle is 12°-20°. In the preferred embodiment of the present invention, the inclined angle of the stator iron core 1004 relative to the rotor iron core is 5°, 8°, 12°, 15°, or 20°. In order to utilize the magnetic field produced by the coils 1006 and 1003 better and reduce the iron consumption, the stator 1004 is made up of stacked silicon steel sheets, and the rotor iron core is made up of an integral steel block or stacked silicon steel sheets.

Now the operation principle of the electromagnetic auxiliary power unit 1000 is further described. The electromagnetic auxiliary power unit 1000 can be helpful for the power because it utilizes the field feature of the homopolar repulsion and the heteropolar attraction between the electromagnetic irons or the permanent magnetic irons. As shown in FIG. 13B, when the rotor iron core 1005 in an upside position approaches the top of the stator iron core 1004, the directions of electrical currents in the two iron cores are opposite (in accordance with the winding methods, the winding methods are the same and the directions of the electrical currents are opposite), so the magnetic field directions produced by the stator iron core 1004 and the rotor iron core 1005 are opposite (for example, the N pole of the stator iron core directs towards the circular center and the N pole of the rotor iron core directs towards the outside of the circle, or the N pole of the stator iron core directs towards the outside of the circle and the N pole of the rotor iron core directs towards the circular center), which induces the repulsion force between the inner iron core and the outer iron core, so the stator iron core 1004 pushes the rotor iron core 1005 to rotate. After the rotor portion rotates through an angle (in the embodiment of two iron cores, about 180 degrees), when one rotor iron core 1005 approaches the next stator iron core 1004, the repulsion force between the same poles may be the resistance force against rotation of the rotor portion. At this time, the coils of the stator portion and the rotor portion need to be power turn-off simultaneously. Due to the power turn-off, the magnetic field between the rotor iron core 1005 and the stator iron core 1004 disappears, but the auxiliary power unit flywheel 1008 continues moving due to the inertia. When the same rotor iron core 1005 goes through another stator iron core 1004, the coils are power turn-on. Now the repulsion force between the same poles which existed between the rotor iron core 1005 and the stator iron core 1004 may push the rotor portion to continue rotating. The auxiliary power aim for the crankshaft rotation is realized by the repeated rotation under the electromagnetic action force.

As known from the above analysis, in order that the electromagnetic auxiliary power unit 1000 can perform the function of auxiliary power, the moment of the power turn-on and the power turn-off is critical. In the present invention, the correct power turn-on and power turn-off of the coils 1006, 1003 is realized because of using an angular displacement sensor 1010 and the electronic control unit ECO 29. As shown in FIG. 13C, the angular displacement sensor 1010 is placed on the crankshaft extension end 371, and the angular displacement sensor 1010 is a potentiometer type, a Hall type, a photoelectric type, a conductive plastics type, a capacitance type or an inductance type angular displacement sensor, which detects the resulting angle of the rotation of the crankshaft. In the initial position, i.e., in the position shown in FIG. 13B, the top stator iron core 1004 and the upper rotor iron core 1005 are located in a line approximately (because the stator iron core 1004 is inclined, actually there is a little angle), and if this position is a reference basis, and the clockwise rotary angle of the upper rotor iron core is referred to as θ, then the initial position θ is 0. When the upper rotor iron core 1005 rotates clockwise, the angular displacement sensor 1010 sends a signal of the angular displacement gradual increase to the electronic control unit ECO 29, the power source (not shown in the figures, which can be an accumulator cell unit or any other power source supplying DC current) of the electromagnetic auxiliary power unit 1000 is turn-on by the electronic control unit ECO 29. At this time, the electromagnetic poles produced by the top stator iron core 1004 and upper rotor iron core have the same polarities, the top stator iron core 1004 repulses the upper rotor iron core 1005, so the upper rotor iron core 1005 is accelerated to rotate clockwise and rotates through an angle. The movement caused by the electromagnetic repulsion force and the movement of the rotor iron core has the same direction, so the auxiliary power rotation is realized. After the upper rotor iron core 1005 rotates through an angle δ, the angular displacement sensor 1010 sends again a signal to the electronic control unit ECO 29, so the coil 1005 and 1003 are power turn-off, and the rotor portion continues rotating. When the upper rotor iron core 1005 rotates through an angle θ of 360/2=180 degrees, the angular displacement sensor 1010 then sends a signal to the electronic control unit ECO 29, the power source of the electromagnetic auxiliary power unit 1000 is turn-on, at this time, the upper rotor iron core 1005 moves to the bottom position (spaced apart 180 degrees from the initial position), the electromagnetic poles produced by the rotor iron core 1004 and the bottom stator iron core 1004 have the same polarities, the bottom stator iron core 1004 repulses the rotor iron core 1005, so the rotor iron core 1005 is accelerated to rotate clockwise and rotates through an angle. The movement caused by the electromagnetic repulsion force and the movement of the rotor iron core has the same direction, so the auxiliary power rotation is realized. Because the numbers of the stator iron core 1004 and the rotor iron core 1005 are the same, and they are equally spaced apart, so above procedures can be done circularly, the crankshaft 56 rotates under the electromagnetic force, so the electromagnetic auxiliary power aim is realized.

The angle δ is set up on the basis of the actual demand. Because the auxiliary power action of the electromagnetic auxiliary power unit is dependent on the repulsion action between the magnetic poles with the same polarity, when an angular offset is presented between the magnetic poles with the same polarity, the effect of the repulsion action would decrease considerably. Additionally, in view of saving energy, the electromagnetic auxiliary power unit with the auxiliary power action can't be power on for a long time. So the angle δ should be a little angle, such as an angle less than 30 degrees, such as 10 degrees, 12 degrees or 15 degrees etc.

It is noted that when the operation principle of the electromagnetic auxiliary power unit of the present invention is described, if it is assumed that the clockwise direction shown in FIG. 13B is positive direction, the rotary angle of the crankshaft is oriented in the anticlockwise direction by the skilled in the art, and if it is assumed that the anticlockwise direction is positive direction, the inclined angle of the stator iron core 1004 in the mounting position shown in 13B should be reversed.

Further, when the electromagnetic auxiliary power unit is in the operating condition, the electronic control unit ECO 29 can adjust the current in the electromagnetic auxiliary power unit 1000 on the basis of the signal from the speed sensor 24. The adjust mode is that when the engine 1 runs in a low speed, the current supplied to the electromagnetic auxiliary unit 1000 is largest, and along with the increase of the rotary speed of the engine, the current in the electromagnetic auxiliary unit 1000 is decreased gradually by the electronic control unit ECO 29, so that the engine has stable output torque in low rotary speed. While in high rotary speed, increasing high rotary property of the engine and accelerating the process of intake and discharge so as to increase maximum rotary speed and efficiency of the engine together. As well, when the electromagnetic auxiliary power unit is in the operating condition, the electronic control unit ECO 29 can also adjust the current in the electromagnetic auxiliary power unit 1000 on the basis of the signal from the oil valve potentiometer 242. The adjusting mode is that when the throat valve is opened to a full extent, the magnitude of current supplied to the electromagnetic auxiliary power unit 1000 is largest, and when the opened extent of the throat valve is decreased, the current in the electromagnetic auxiliary power unit 1000 is decreased gradually by the electronic control unit ECO 29.

Figure 15B:
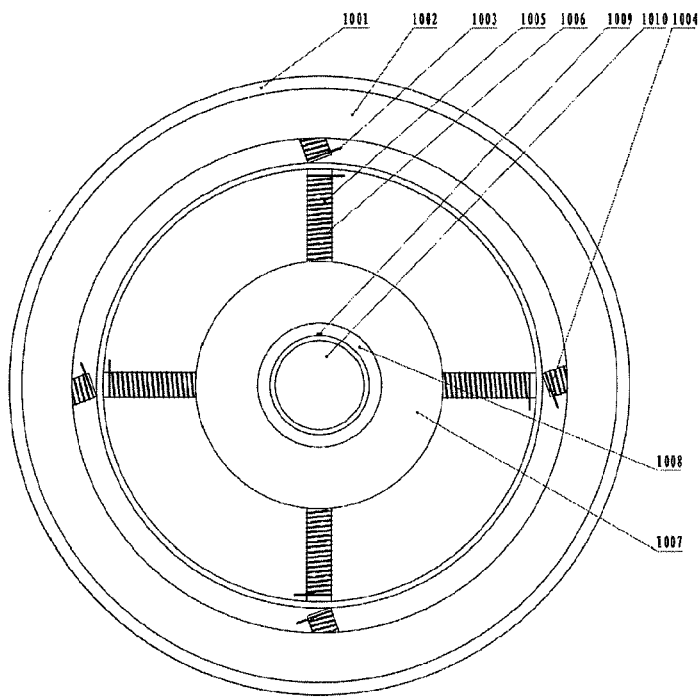
FIG. 15B is a front view of FIG. 15A.
Figure 15C:
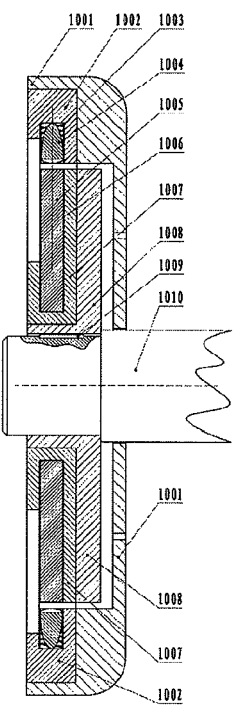
FIG. 15C is a central sectional view of FIG. 15A.
Figure 16A:
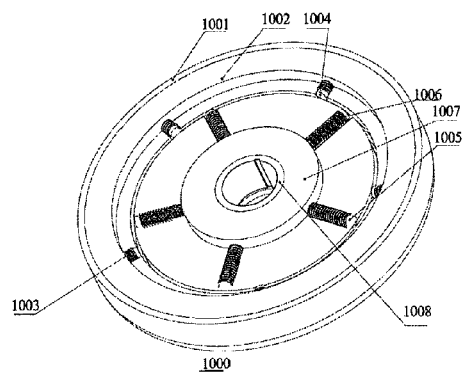
FIG. 16A is a perspective view of another preferred embodiment of the electromagnetic auxiliary power unit of the air-powered generator system with the electromagnetic auxiliary power unit in FIG. 1, which illustrates that the rotor and the stator each has five iron cores.
Figure 16B:
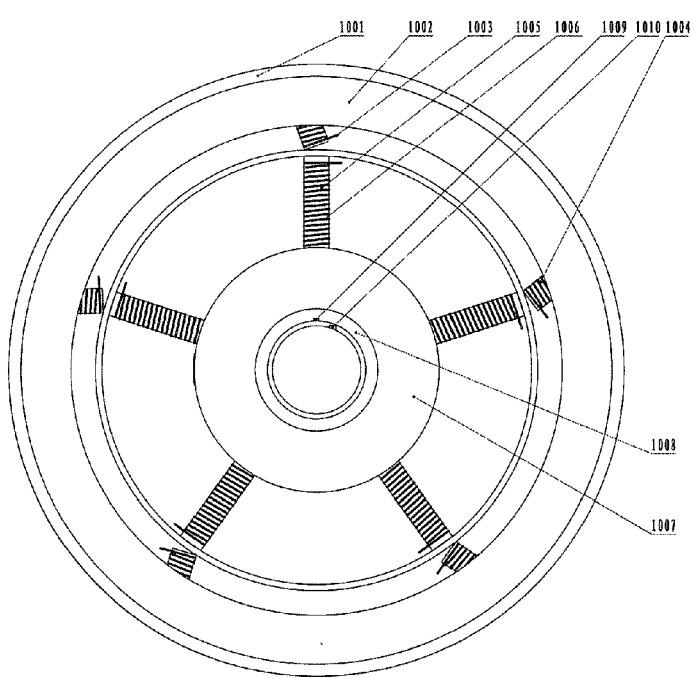
FIG. 16B is a front view of FIG. 16A.
Figure 16C:
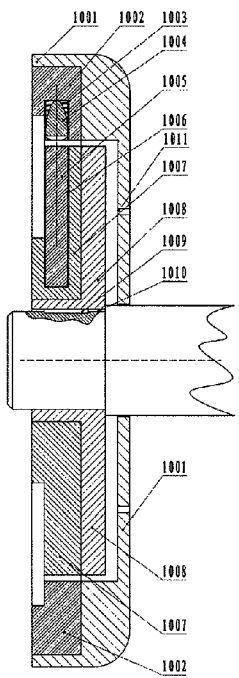
FIG. 16C is a central sectional view of FIG. 16A.

FIG. 14, FIG. 15 and FIG. 16 illustrate a variety of the electromagnetic auxiliary power unit 1000 of the present invention. Their structure and operation principle are the same as that of the electromagnetic auxiliary power unit 1000 in FIG. 13 essentially, and the same features are not detailed again. The details of the electromagnetic auxiliary power unit shown in FIG. 14, FIG. 15 and FIG. 16 could be known by the skilled in the art from the above description. The structural distinction thereof is that the numbers of the stator iron cores 1004 and the rotor iron cores 1005 are different. FIG. 14 illustrates the condition that the rotor and the stator each has three iron cores. With reference to FIG. 14B, three stator iron cores are distributed uniformly on the stator iron core fixed disk 1002 and the included angles between the stator iron cores are 120 degrees, and three rotor iron cores are distributed uniformly on the rotor iron core fixed disk 1005 and the included angles between the rotor iron cores are 120 degrees. In this embodiment, moment of the power turn-on and the power turn-off of the electromagnetic auxiliary power unit 1000 is different from that in the FIG. 13, and the operation principle thereof is the same as that in the FIG. 13. That is to say, in the initial position (i.e., the position shown in FIG. 14B), the top stator iron core 1004 and the upper rotor iron core 1005 are located in a line approximately. When the rotor iron core 1005 rotates clockwise, the angular displacement sensor 1010 sends a signal of the angular displacement gradual increase to the electronic control unit ECO 29, the power source of the electromagnetic auxiliary power unit 1000 is turn-on by the electronic control unit ECO 29. At this time, the electromagnetic poles produced by the top stator iron core 1004 and upper rotor iron core have the same polarities, the top stator iron core 1004 repulses the upper rotor iron core 1005, so the upper rotor iron core 1005 is accelerated to rotate clockwise and rotates through an angle. After the upper rotor iron core 1005 rotates through an angle δ, the angular displacement sensor 1010 sends again a signal to the electronic control unit ECO 29, so the coil 1005 and 1003 are power turn-off, and the rotor portion continues rotating due to the inertia. When the upper rotor iron core 1005 rotates through an angle θ of 360/3=120 degrees, the angular displacement sensor 1010 then sends a signal to the electronic control unit ECO 29, the power source of the electromagnetic auxiliary power unit 1000 is turn-on by the electronic control unit ECO 29, at this time, the upper rotor iron core 1005 moves to a second position (spaced apart 120 degrees from the initial position). The electromagnetic poles produced by the rotor iron core 1004 and the bottom stator iron core 1004 have the same polarities, the stator iron core 1004 in the second position repulses the rotor iron core 1005, so the rotor iron core 1005 is accelerated to rotate clockwise and rotates through an angle. The movement caused by the electromagnetic repulsion force and the movement of the rotor iron core has the same direction, so the auxiliary power rotation is realized. So when the rotor iron core rotates through 120 degrees, the coil of the electromagnetic auxiliary power unit 1005 is controlled by the electronic control unit ECO 29 to turn on and turn off once, so above procedures can be done periodically, the crankshaft 56 rotates under the electromagnetic force, so the electromagnetic auxiliary power aim is realized.

FIG. 15 illustrates the condition that the rotor and the stator each has four iron cores. With reference to FIG. 15B, four stator iron cores 1004 are distributed uniformly on the stator iron core fixed disk 1002 and the included angles between the stator iron cores are 90 degrees, and four rotor iron cores are distributed uniformly on the rotor iron core fixed disk 1005 and the included angles between the rotor iron cores are 90 degrees. In the embodiment, moment of the power turn-on and the power turn-off of the electromagnetic auxiliary power unit 1000 is different from that in the FIG. 13 and FIG. 14, and the operation principle thereof is the same as that in the FIG. 13 and FIG. 14. The different feature is the moment of the angular displacement sensor 1010 sending the signal to the electronic control unit ECO 29. In the embodiment shown in FIG. 15, when the rotor iron core 1005 rotates through an angle θ of 360/4=90 degrees, the angular displacement sensor 1010 then sends a signal to the electronic control unit ECO 29, the power source of the electromagnetic auxiliary power unit 1000 is turn-on by the electronic control unit ECO 29, so the auxiliary power rotation is realized. So when the rotor iron core rotates through 90 degrees, the coil of the electromagnetic auxiliary power unit 1005 is controlled by the electronic control unit ECO 29 to turn on and turn off once, the procedures are repeated periodically, so the electromagnetic auxiliary power aim is realized.

FIG. 16 illustrates the condition that the rotor and the stator each have five iron cores. With reference to FIG. 16B, five stator iron cores 1004 are distributed uniformly on the stator iron core fixed disk 1002 and the included angles between the stator iron cores are 72 degrees, and five rotor iron cores are distributed uniformly on the rotor iron core fixed disk 1005 and the included angles between the rotor iron cores are 72 degrees. In this embodiment, moment of the power turn-on and the power turn-off of the electromagnetic auxiliary power unit 1000 is different from that in the FIG. 13, FIG. 14 and FIG. 15, and the operation principle thereof is the same as that in the FIG. 13, FIG. 14 and FIG. 15. The different feature is the moment of the angular displacement sensor 1010 sending the signal to the electronic control unit ECO 29. In the embodiment shown in FIG. 16, when the rotor iron core 1005 rotates through an angle θ of 360/5=72 degrees, the angular displacement sensor 1010 then sends a signal to the electronic control unit ECO 29, the power source of the electromagnetic auxiliary power unit 1000 is turn-on by the electronic control unit ECO 29, so the auxiliary power rotation is realized. So when the rotor iron core rotates through 72 degrees, the coil of the electromagnetic auxiliary power unit 1005 is controlled by the electronic control unit ECO 29 to turn on and turn off once, the procedures are repeated periodically, so the electromagnetic auxiliary power aim is realized.

As stated above, the electromagnetic auxiliary power unit disclosed in the present invention has a simple structure, and is made up of separated bodies, so it is convenient to repair and maintain, and the unit can assure that the outputting torque is stable when the air-powered engine runs at a low speed, and the rotary speed of the engine can be improved. The existence of the electromagnetic auxiliary power unit improves the efficiency of the whole air-power generator system, and the generation efficiency is improved.

The present invention is disclosed in detail in the description which includes the preferred embodiments and makes the skill in the art be able to perform the present invention, which includes the manufacture and utilization of any equipment or system and the introduced process. The claimed scope is defined by the additional claims, and the present invention can be modified, varied or altered without deviation from the scope and spirit of the present invention.

What is claimed is:

1. An air-powered generator system with an electromagnetic auxiliary power unit comprising: an engine, the engine includes a cylinder, a cylinder head system, an intake pipeline, a discharge pipeline, a piston, a linkage, a crankshaft, a discharge camshaft, an intake camshaft, a front gear box system and a back gear box, said piston is connected to the crankshaft via the linkage, said front gear box system is adapted to transmit the movement of the crankshaft and the discharge and intake camshafts, an air throat hole for the compressed air intake and a discharge hole for the end gas discharge are placed in said cylinder head system, the air-powered generator system also includes a high pressure gas tank set which is connected to an external charge device via a pipeline and a constant pressure tank which is connected to the high pressure gas tank set via a pipeline, characterized in that said air-powered generator system with the electromagnetic auxiliary power unit also includes an intake speed control valve which is communicated with the constant pressure tank via a pipeline, a controller system, an electromagnetic auxiliary power unit, multiple-column power distributor which is connected to the crankshaft of the engine, a generator system which is connected to the multiple-column power distributor via a clutch, an electronic control unit ECO which controls the intake speed control valve on the basis of the detected signal of a sensor, a power distribution device and an end gas recycle loop, characterized in that the said end gas recycle loop includes a discharge header, an air compressor, a condenser, an end gas recycle tank, an electro-drive turbine unidirectional suction pump and an end gas muffler, wherein the end gas enters into the end gas muffler through the discharge header and is suctioned in the end gas recycle tank by the electro-drive turbine unidirectional suction pump, the end gas accumulated in the end gas recycle tank is sent to the high pressure gas tank set after compressed and pressurized by the air compressor and after cooled by the condenser.

2. An air-powered generator system with an electromagnetic auxiliary power unit comprising: a two-stroke engine, the engine includes a cylinder, a cylinder head system, an intake pipeline, a discharge pipeline, a piston, a linkage, a crankshaft, a discharge camshaft, an intake camshaft, a front gear box system and a back gear box, said piston is connected to the crankshaft via the linkage, said front gear box system is adapted to transmit the movement of the crankshaft and the discharge and intake camshafts, an air throat hole for the compressed air intake and a discharge hole for the end gas discharge are placed in said cylinder head system, the air-powered generator system also includes a high pressure gas tank set which is connected to an external charge device via a pipeline and a constant pressure tank which is connected to the high pressure gas tank set via a pipeline, characterized in that said air-powered generator system with the electromagnetic auxiliary power unit also includes an intake speed control valve which is communicated with the constant pressure tank via a pipeline, a controller system, an electromagnetic auxiliary power unit, a multiple-column power distributor which is connected to the crankshaft of the engine, a generator system which is connected to the multiple-column power distributor via a clutch, an electronic control unit ECO which controls the intake speed control valve on the basis of the detected signal of a sensor, a power distribution device and an end gas recycle loop, characterized in that the said controller system includes a high pressure common rail constant pressure pipe, a controller upper cover, a controller mid seat and a controller bottom base, the controller upper cover, the controller mid seat and the controller bottom base are connected by bolts removably and hermetically.

3. The air-powered generator system with the electromagnetic auxiliary power unit according to claim 2, characterized in that an intake pipeline is placed in the said controller upper cover, the intake pipeline is connected to the high pressure common rail constant pressure pipe via a threaded connection, a controller intake valve, a controller valve spring, an oil seal bush, a controller valve spring bottom base and a controller valve seat are mounted in said controller mid seat, said controller intake valve is butted against the controller valve seat under a pre-action of the controller valve spring, a control tappet which controls an opening and closure of the controller intake valve is placed in said controller bottom base, and the controller tappet is actuated by an intake camshaft.

4. An electromagnetic auxiliary power unit for an air-powered engine assembly, said air-powered engine assembly comprises: an engine which includes a cylinder, a cylinder head system, an intake pipeline, a discharge pipeline, a piston, a linkage, a crankshaft, a discharge camshaft and an intake camshaft, the air-powered engine assembly also includes a high pressure gas tank set which is connected to an external charge device via a pipeline, a constant pressure tank which is connected to the high pressure gas tank set via a pipeline, an intake speed control valve which is communicated with the constant pressure tank via a pipeline, and an electronic control unit ECO, said electromagnetic auxiliary power unit includes a stator portion, a rotor portion and an auxiliary power unit housing, said stator portion and the rotor portion are set up independently, and said stator portion is fixed on said auxiliary power unit housing, characterized in that the said stator portion includes a stator iron core fixed disk, a stator iron core and a stator iron core coil, said rotor portion includes a rotor iron core fixed disk, a rotor iron core, a rotor iron core coil and an auxiliary power unit flywheel, characterized in that said stator iron core fixed disk and the auxiliary power unit housing are threadedly connected or interferentially fit, the said auxiliary power unit housing is fixed on the engine by a plurality of fasteners penetrated through housing mounting holes, the rotor iron core fixed disk and the auxiliary power unit flywheel are threadedly connected or interferentially fit, and the said auxiliary power unit flywheel is fixed on an extensive end of the crankshaft to rotate along with the crankshaft.

\* \* \* \* \*